(12) United States Patent
Tanaka et al.

(10) Patent No.: US 11,938,657 B2
(45) Date of Patent: Mar. 26, 2024

(54) MULTI-SCREW KNEADER AND METHOD FOR PRODUCING NANO-COMPOSITE USING SAID MULTI-SCREW KNEADER, AND DISK-SHAPED SEGMENT USED FOR SAID KNEADER AND SAID METHOD

(71) Applicant: THE DOSHISHA, Kyoto (JP)

(72) Inventors: Tatsuya Tanaka, Kyoto (JP); Koki Matsumoto, Kyoto (JP)

(73) Assignee: THE DOSHISHA, Kyoto (JP)

( * ) Notice: Subject to any disclaimer, the term of this patent is extended or adjusted under 35 U.S.C. 154(b) by 483 days.

(21) Appl. No.: 16/548,132

(22) Filed: Aug. 22, 2019

(65) Prior Publication Data
US 2019/0389092 A1 Dec. 26, 2019

Related U.S. Application Data

(63) Continuation of application No. PCT/JP2018/006270, filed on Feb. 21, 2018.

(30) Foreign Application Priority Data

Feb. 22, 2017 (JP) .................................. 2017-030841

(51) Int. Cl.
 B29B 7/48 (2006.01)
 B29C 48/505 (2019.01)

(52) U.S. Cl.
 CPC .............. *B29B 7/482* (2013.01); *B29B 7/488* (2013.01); *B29C 48/505* (2019.02)

(58) Field of Classification Search
 CPC ........ B29B 7/482; B29B 7/488; B29C 48/505
 (Continued)

(56) References Cited

U.S. PATENT DOCUMENTS 2,693,348 A * 11/1954 Ellermann ............ B29C 48/395
366/85
3,447,582 A * 6/1969 Street ...................... B01J 19/20
159/7

(Continued)

FOREIGN PATENT DOCUMENTS

| JP | 59-48136 | 3/1984 |
| JP | 11-10709 | 1/1999 |

(Continued)

OTHER PUBLICATIONS

International Search Report dated Apr. 10, 2018 in International (PCT) Application No. PCT/JP2018/006270.

(Continued)

*Primary Examiner* — Marc C Howell
(74) *Attorney, Agent, or Firm* — WENDEROTH, LIND & PONACK, L.L.P.

(57) ABSTRACT

A multi-screw kneader is configured to exhibit an extensional flow function before and behind holes of a disk-shaped segment and a method for producing a nano-composite uses the multi-screw kneader. The multi-screw kneader includes a plurality of kneading screws and the disk-shaped segment in a barrel. The disk-shaped segment partitions the inside of the barrel downstream of a part for supplying a kneading material and includes shaft receiving parts through which rotating shafts of the kneading screws are to rotatably pass and the holes are defined in a periphery of the shaft penetrating parts and are configured to serve as flow channels of the kneading material. The method for producing the nano-composite includes charging nanoparticles as a resin additive using the multi-screw kneader.

15 Claims, 39 Drawing Sheets

(58) Field of Classification Search
USPC .......................................................... 366/85
See application file for complete search history.

(56) References Cited

U.S. PATENT DOCUMENTS

| | | | | |
|---|---|---|---|---|
| 3,501,807 A | * | 3/1970 | Hans-Werner | B29C 48/268 |
| | | | | 425/192 R |
| 5,738,884 A | * | 4/1998 | Sato | B29B 7/428 |
| | | | | 425/197 |
| 5,962,036 A | * | 10/1999 | Hauck | B29C 48/50 |
| | | | | 366/85 |
| 2015/0266208 A1 | * | 9/2015 | Ahlgrimm | B29B 7/483 |
| | | | | 366/79 |
| 2015/0275063 A1 | * | 10/2015 | Raman | C08K 3/34 |
| | | | | 252/75 |

FOREIGN PATENT DOCUMENTS

| | | |
|---|---|---|
| JP | 2013-535358 | 9/2013 |
| WO | 99/61213 | 12/1999 |
| WO | 2012/010693 | 1/2012 |

OTHER PUBLICATIONS

Tatsuya Tanaka, "Changes of the Mixing Technology/System by a Twin Screw Extruder and Application to Nano Filler Dispersion Techniques", Bando Technical Report, No. 18 Mar. 3, 2014, pp. 2-8 (with English abstract).

Extended European Search Report dated Nov. 12, 2020 in connection with European Application No. 18757298.7.

* cited by examiner

FIG. 24
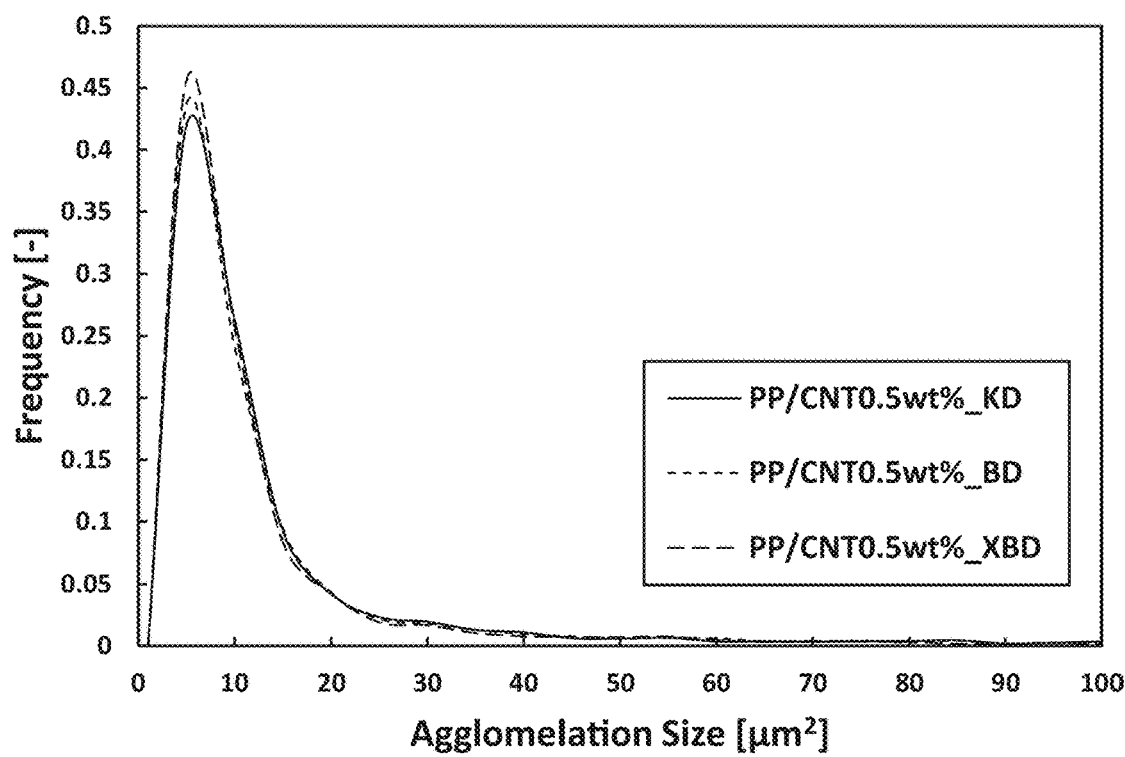
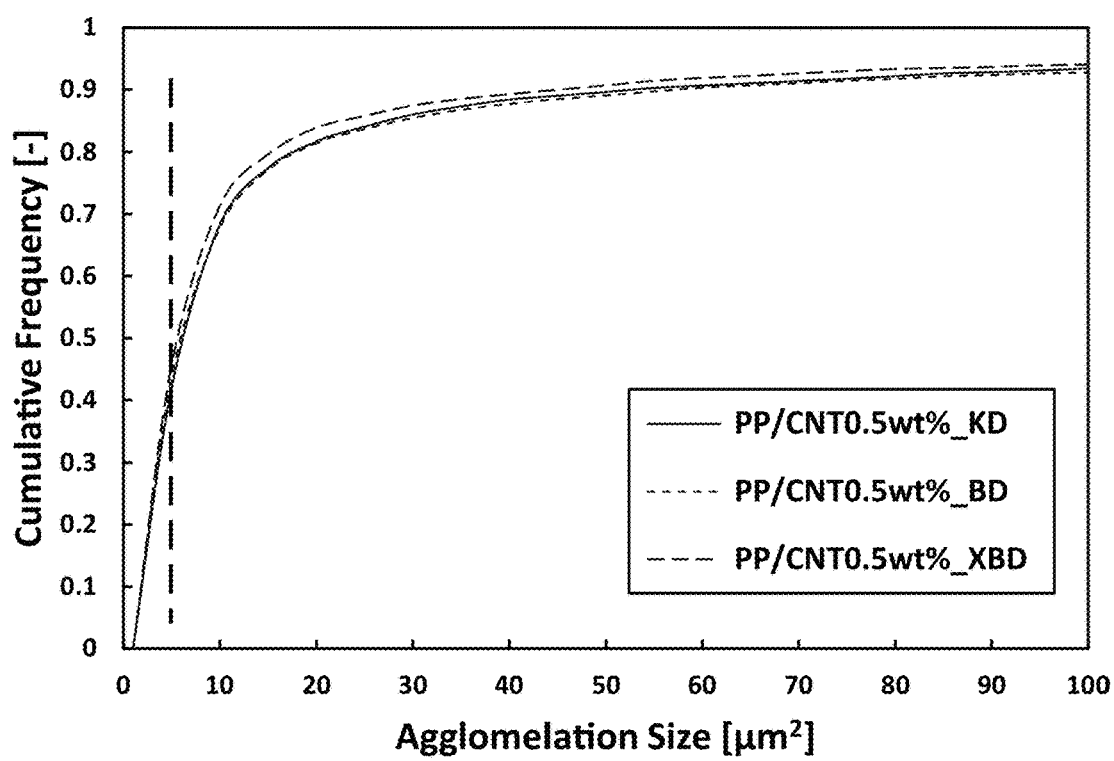

FIG. 32
| | 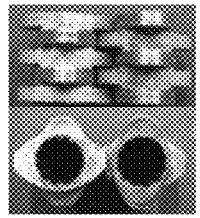 KD | 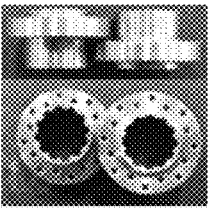 BD | 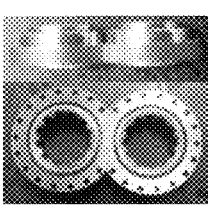 XBD |
|---|---|---|---|
| SHEAR HEAT GENERATION | HIGH | LOW | LOW |
| SHEAR KNEADING | ◎ | × | △ |
| EXTENSIONAL KNEADING | ○ | ○ | ◎ |
| CNT DISPERSION | ○ | △ | ◎ |
| VOLUME RESISTIVITY | ○ | △ | ◎ |
| MECHANICAL STRENGTH | △ | ○ | ◎ |

MULTI-SCREW KNEADER AND METHOD FOR PRODUCING NANO-COMPOSITE USING SAID MULTI-SCREW KNEADER, AND DISK-SHAPED SEGMENT USED FOR SAID KNEADER AND SAID METHOD

BACKGROUND OF THE INVENTION

Field of the Invention

The present invention relates to a multi-screw kneader and a method for producing a nano-composite using the multi-screw kneader, and a disk-shaped segment to be used therein.

Description of the Related Art

Multi-screw kneaders have undergone a variety of developments regarding the shape, arrangement, configuration, etc. of screws depending on the purpose of kneading:
(1) Homogenizing: elimination of heterogeneous structure of a polymer after polymerization, mixing of an additive, and dispersion;
(2) Plasticization or melting of polymer: a polymer is plasticized or melted and is supplied to, for example, a calender processing line;
(3) Dehydration or devolatilization (desolventization and monomer removal): drying of a polymer, and devolatilization of the monomer and the solvent contained in the polymer after polymerization;
(4) Chemical reaction: chemical reactions, such as polymerization, depolymerization, and grafting of a polymer, are performed;
(5) Polymer blend and alloy: mixing and dispersion of different kinds of polymers or a compatibilizer;
(6) Micro-mixing of fiber reinforcement or inorganic filler: mixing of a fiber reinforcement, mixing of an inorganic filler, or dispersion of micro-size particles of aggregate; and
(7) Nano-mixing of fiber reinforcement or inorganic filler such as carbon nanotubes (which refers to uniform dispersion in a resin at a nano order. The same applies hereinafter.): mixing of a fiber reinforcement, mixing of an inorganic filler, and dispersion of nano-size particles of aggregate (See, for example, Table 2 on page 3 of Non-Patent Literature 1).

A kneading disk is one of basic techniques of kneading with a multi-screw kneader.

A kneading disk is a plate-like member having an elliptical cross section, and a plurality of the kneading disks are serially arranged in the axial direction. The kneading disk rotates with the rotation of the kneading screw, and a kneading material is guided between the kneading disk and the inner wall of the barrel and is thereby kneaded (For example, see Patent Literature 1).

The effects of distribution and dispersion are enhanced with an increase in the torsion angle of the kneading disk. In contrast, a decrease in the torsion angle reduces the distributing and dispersing effects and increases the transferring effect.

In addition, an increase in the disk thickness increases the shear stress at the chip portion to enhance the distributing effect. In contrast, a decrease in the disk thickness enhances the distributing effect, but decreases the dispersing effect.

Thus, the distributing and dispersing abilities can be modified by changing the torsion angle and the thickness of the disk.

However, as described above, the purposes of kneading are diverse, and among the above-mentioned purposes of kneading, in particular, (7) nano-mixing of fiber reinforcement or inorganic filler such as carbon nanotubes has a limitation to be achieved only by controlling the kneading disks.

Here, in a multi-screw kneader using kneading disks, although the shear flow is dominant, it is believed that in dispersion of nanoparticles, extensional flow is more effective than the shear flow.

Incidentally, the shear flow is a flow that tears a material off by the velocity gradient, and the extensional flow is a flow that extends a material in the main stress direction.

Accordingly, in order to satisfy a novel need for nano-mixing, a blister disk has been proposed for achieving a higher extensional flow instead of kneading disks (for example, see Non-Patent Literature 1). This blister disk has small holes and shows an extensional flow function by allowing a kneading material to pass through the small holes.

CITATION LIST

Patent Literature

PTL 1: Japanese Unexamined Patent Application Publication No. 11-10709

Non Patent Literature

NPL 1: Tatsuya TANAKA, "Nijiku Konren Oshidashiki ni yoru Konren Gijutsu/Souchi no Hensen oyobi Nanofira Bunsan Gijutsu no Oyo (Kneading technique using twin-screw kneading extruder, transition of apparatus, and application of nano filler dispersion technology)", Bando Technical Report, Bando Chemical Industries, Ltd., pp. 2 to 8, 2014

BRIEF SUMMARY OF THE INVENTION

However, it was revealed that in known blister disks, the effect of the extensional flow is not sufficiently exhibited.

Accordingly, it is an object of the present invention to provide a multi-screw kneader that can sufficiently exhibit an extensional flow function functioning before and behind small holes of a disk-shaped segment having the small holes and a method for producing a nano-composite using the multi-screw kneader and a disk-shaped segment to be used therein.

It is known that the extensional flow is caused by a large change in the flow rate occurring at the small hole inlets and a pressure drop of a large change gradient accompanied therewith. Based on this, in order to solve the above-mentioned problems, the present inventors diligently studied. In its process, it was found that dispersion of nanoparticles can be enhanced by improving the pressure drop occurring at the small hole portion (see FIG. 3 described below). In addition, it was demonstrated that in known blister disks, leakage occurs between disks, and thereby the pressure drop decreases to inhibit the extensional flow function.

Accordingly, a configuration for sufficiently exhibiting the extensional flow function by eliminating the leakage between disks and suppressing a decrease in pressure drop was further variously studied, and as a result, the following configuration was found.

That is, the multi-screw kneader according to the present invention includes a plurality of kneading screws for kneading a kneading material and a disk-shaped segment for promoting extensional flow of the kneading material in a barrel. The disk-shaped segment is disposed downstream a part for charging the kneading material so as to partition the inside of the barrel and has a plurality of shaft penetrating parts through which the rotating shafts of the kneading screws rotatably pass and a large number of small holes punched in a periphery of these shaft penetrating parts and serving as flow channels of the kneading material.

The method for producing a nano-composite according to the present invention includes a step of charging nanoparticles as a resin additive using the multi-screw kneader according to the present invention.

In addition, the disk-shaped segment according to the present invention is used in a multi-screw kneader including a plurality of kneading screws for kneading a kneading material in a barrel and partitions the inside of the barrel and has a plurality of shaft penetrating parts through which the rotating shafts of the kneading screws rotatably pass and a large number of small holes punched in a periphery of these shaft penetrating parts and serving as flow channels of the kneading material.

Incidentally, in the present specification, the term "nanoparticles" generally refers to particles having a particle diameter of 0.1 to 100 nm. However, even if the diameter falls outside the above range (0.1 to 100 nm), the particles are included in the concept of "nanoparticles" provided that the range of the error is within a range that does not impair the effects of the present invention.

Advantageous Effects of Invention

The multi-screw kneader of the present invention can improve the pressure drop than multi-screw kneaders using conventional blister disks and can sufficiently exhibit the extensional flow function of the disk-shaped segment having small holes. Accordingly, when the multi-screw kneader is applied to kneading of, in particular, a kneading material containing a resin and a resin additive, the dispersibility of the resin additive (in particular, dispersibility of nanoparticles) is excellent, and the mechanical strength of the molded product is increased, compared to conventional kneaders. Furthermore, the multi-screw kneader has an advantage of less shear heat generation.

Since the method for producing a nano-composite of the present invention uses the multi-screw kneader having the advantages described above, the pressure drop is improved compared to the multi-screw kneaders including conventional blister disks, and the extension function works better to provide a nano-composite having good dispersibility of nanoparticles and excellent mechanical strength.

The disk-shaped segment of the present invention brings the above-described advantages in the multi-screw kneader and the method for producing a nano-composite described above.

BRIEF DESCRIPTION OF DRAWINGS

FIG. 24 includes graphs showing size distribution of aggregates in Example 1 and Comparative Examples 1 and 2.

FIG. 32 is a diagram summarizing the results of evaluation tests in Example 1 and Comparative Examples 1 and 2.

DETAILED DESCRIPTION OF THE PREFERRED EMBODIMENTS

Preferred embodiments of a multi-screw kneader and a method for producing a nano-composite using the multi-screw kneader and a disk-shaped segment to be used therein according to the present invention will now be described in detail.

However, the scope of the present invention is not limited to such descriptions, and appropriate modifications and implementations other than the following examples can be made without departing from the gist of the present invention For example, although examples of applying the present invention to extrusion molding will be shown below, the multi-screw kneader according to the present invention is not limited to extruders and may be another apparatus having a kneading mechanism by a plurality of kneading screws as in above or may be a part of such an apparatus.

Although a twin-screw kneader will now be described as an example, those skilled in the art can easily apply the present invention to a multi-screw kneader having three or more screws according to common technical acknowledge and the following description.

Furthermore, the various dimensions described below are also mere examples, and those skilled in the art can easily apply the present invention to various multi-screw kneaders having different scales from those of the following examples according to common technical acknowledge and the following exemplary description.

Figure 1:
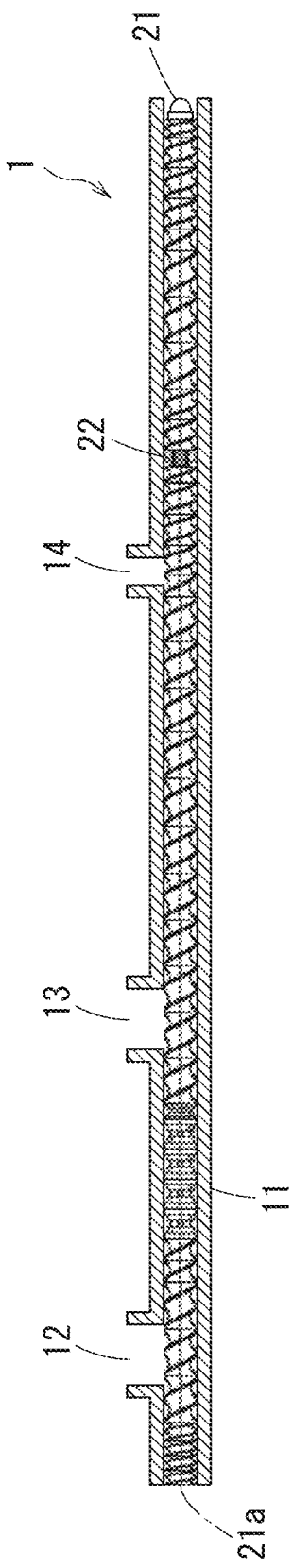
FIG. 1 is a cross-sectional schematic diagram illustrating an embodiment of a multi-screw kneader according to the present invention.

A twin-screw kneading extruder according to an embodiment of the present invention is shown in FIG. 1.

As shown in FIG. 1, the twin-screw kneading extruder 1 has the same basic configuration as those of known kneaders and includes a hollow barrel 11, a hopper 12 for supplying a resin into the barrel 11, an additive input port 13 (side feeder) for supplying a resin additive into the barrel 11, and a vent 14 for, for example, deaeration.

In the barrel 11, a kneading screw 21 is disposed along the axial direction. Since the kneading extruder of the embodiment is a twin-screw type, two kneading screws are paired.

A disk-shaped segment 22 is disposed at an intermediate position of the kneading screw 21 and on the downstream side of the additive input port 13. Incidentally, the term "intermediate position" does not necessarily mean the center, but merely means that the position is not the position of the inlet or the outlet. In addition, in the embodiment, only one disk-shaped segment 22 is disposed, but two or more disk-shaped segments may be disposed. In such a case, the segments may be arranged continuously or with intervals. Since the disk-shaped segment 22 is a segment type, for example, the pressure control, the position, and the number thereof can be freely set.

The resin supplied through the hopper 12 is transferred by the kneading screw 21 from the upstream (on the left side in FIG. 1) to the downstream (on the right side in FIG. 1) along the axial direction while being kneaded. On this occasion, a resin additive is supplied from the additive input port 13 on the way. From the vent 14, for example, the gas generated during kneading is discharged.

The disk-shaped segment 22 has a cross-sectional shape that is approximately the same as the shape of the inner cross-section of the barrel 11 to partition the inside of the barrel 11. Specifically, the disk-shaped segment 22 has a cross-sectional shape such as two circles partially overlapped, as shown in FIG. 2, and the barrel 11 also has a similar inner cross-sectional shape.

In the disk-shaped segment 22, since a kneading material passes through small holes 221a (described later) provided to the segment 22, a gap between the segment 22 and the inner wall of the barrel 11 is not necessary, unlike a known kneading disk in which a kneading material passes through a clearance between a segment and the inner wall of the barrel 11.

However, a gap may be provided to such an extent as to facilitate the process of inserting the disk-shaped segment 22 into the barrel 11.

Figure 2:
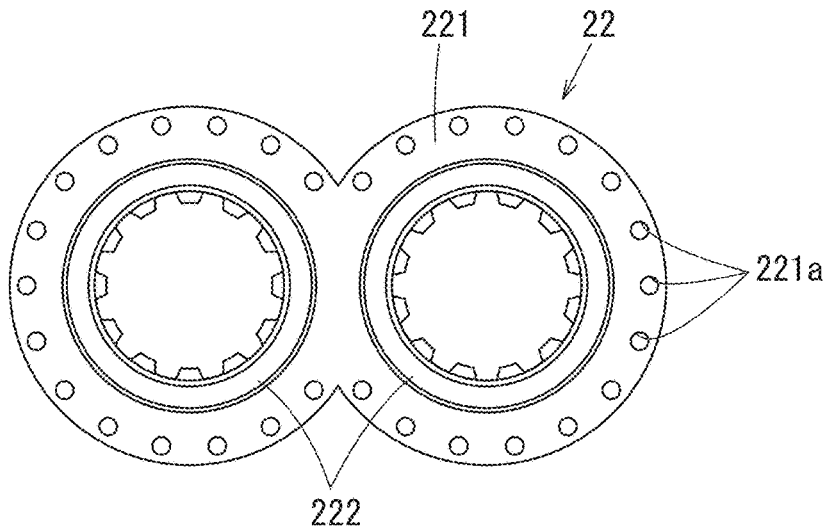
FIG. 2 is a front view illustrating a disk-shaped segment according to an embodiment of a multi-screw kneader according to the present invention.

As shown in FIG. 2, the disk-shaped segment 22 includes a disk body 221 and shaft penetrating parts 222 through which the rotating shafts 21a of the kneading screws 21 rotatably pass.

Examples of the shaft penetrating part 222 include bearings, such as ball bearings, sleeve bearings, and roller bearings.

The disk-shaped segment 22 does not rotate with the rotation of the kneading screw 21 and is in a fixed state at the time of kneading extrusion.

In a periphery of the shaft penetrating parts 222, a large number of small holes 221a serving as a flow channel of the kneading material are formed.

As obvious from the description above, the disk-shaped segment of the multi-screw kneader of the present invention is a fixed type in which the segment does not rotate with the rotation of the kneading screw, and a kneading material extremely efficiently passes through the small holes. Accordingly, no leakage occurs between the disks, unlike known blister disks where two disks are separated from each other and each rotate with the rotation of the kneading screw, and can produce a large pressure drop.

Here, the present inventors have found that the dispersibility of a resin additive is improved through an extensional flow by giving a large pressure drop and passing through the small holes.

Figure 3:
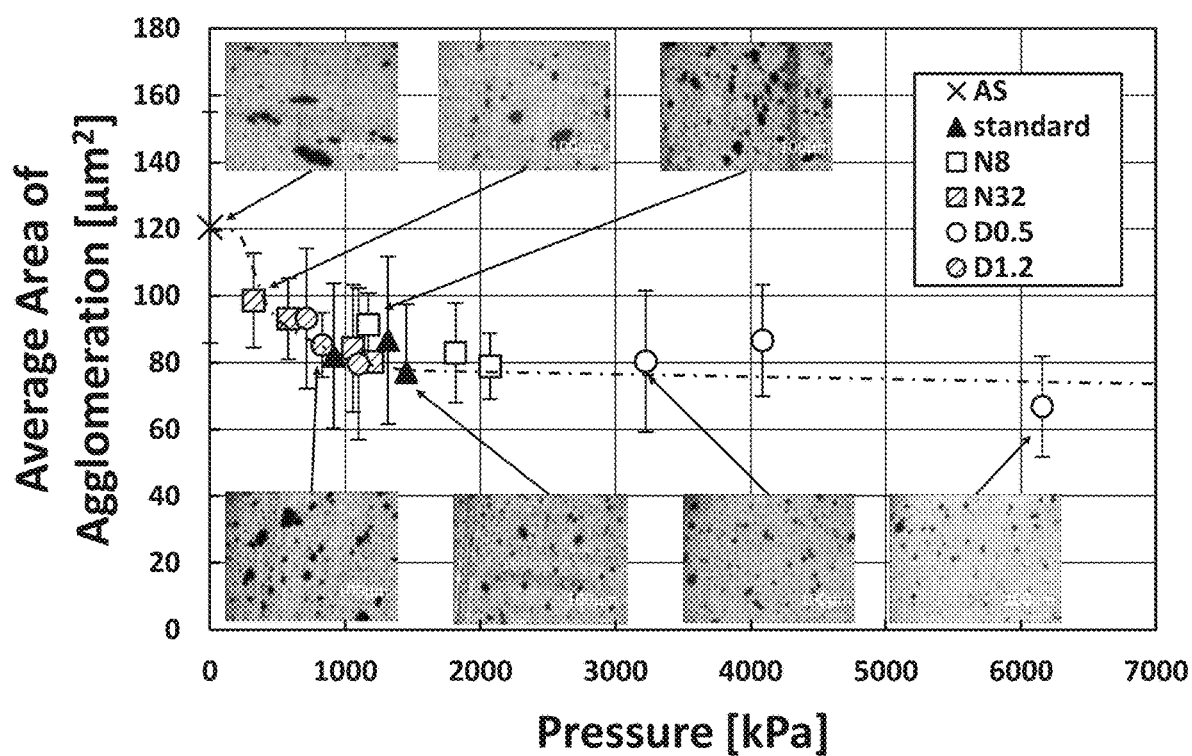
FIG. 3 is a graph showing a relationship between pressure and dispersibility when conditions are variously changed in production of a nano-composite by a twin-screw kneading extruder.

Data showing the above are shown in FIG. 3. Although description of detailed experimental conditions, etc. is omitted, briefly, the shape and number of the small holes and the extrusion rate are changed, and dispersion of carbon nanotubes in polypropylene is measured.

As shown in FIG. 3, a larger pressure drop promotes the extensional flow and enhances the dispersibility of the resin additive. In this example (resin: polypropylene, resin additive: carbon nanotubes), high dispersibility is obtained at a pressure drop of about 1.5 to 2.0 MPa.

Therefore, accordingly to the present invention, a large pressure drop can be produced compared to known blister disks. As a result, the effect of the extensional flow can be sufficiently exhibited, and excellent dispersibility can be obtained.

From the above, it is preferable to secure a pressure drop necessary for desired dispersion within designed pressure resistance while taking care not to exceed the designed pressure resistance of the multi-screw kneader.

Accordingly, it is also desirable to design the diameter, the depth in the axial direction, and the number of the small holes 221a, the total area of the openings of the small holes 221a on the resin flow inlet side, the position, and the extrusion rate while considering the designed pressure resistance of the multi-screw kneader and the dispersibility.

For example, although the pressure drop can be increased by increasing the depth of small holes, the small holes desirably have a depth as small as possible for avoiding shear heat generation because the inside of the small holes is in a state of pure shear. In addition, a function of distributing nanoparticles can be expected by a larger number of small holes. The diameter of the small holes is usually determined considering the size of nanoparticles of the resin additive.

From the viewpoint above, an example of preferable ranges will be described below.

That is, for example, the diameter of the small holes 221a can be 0.5 to 1.5 mm; the depth of the small holes 221a in the axial direction can be determined such that the ratio of the depth (L) to the screw diameter (D), L/D, is 1/12 to 1/4; and the number of the small holes 221a can be 2 to 64.

In addition, the total area of the openings of the small holes 221a on the resin flow inlet side can be, for example, 4% to 20%, preferably 20% or less, and more preferably 10% or less of the inner cross-sectional area of the barrel 11.

In the embodiment, 30 small holes 221a are arranged in one line concentric with each of the shaft penetrating parts 222. Alternatively, small holes may be arranged in two or more lines.

Although small holes are not punched between one shaft penetrating part 222 and the other shaft penetrating part 222, small holes may be punched between these shaft penetrating parts 222.

Furthermore, in the configuration of the above-described embodiment, the additive input port 13 is disposed in the middle of the barrel 11, and a resin additive is charged therefrom. Alternatively, a configuration for simultaneously charging a resin and a resin additive from the hopper 12 may be adopted.

In the above-described embodiment, although a kneading material containing a resin and a resin additive is kneaded, the present invention is not limited thereto and may be applied to kneading other kneading material that requires a good extensional flow.

For example, the present invention can also be applied to kneading of a polymer blend (alloy). There are compatible and incompatible systems in the polymer blend, and the degree of compatibility in the compatible system also varies. The present invention can be applied to any of them. More details are as follows.

Dispersion of a polymer blend depends on the following parameters:

Viscosity ratio: $\lambda = \eta_d / \eta_m$,
Capillary number: Ca(We), and
Time required for dispersion: t*.

The conditions for droplet dispersion are as the following expression (Taylor's equation):

$$Ca = \frac{\eta_m \dot{y} d}{v} \geq \frac{16(\lambda+1)}{19\lambda+16}. \quad \text{[Math. 1]}$$

In the expression,
$\eta_m$: mother phase viscosity,
$\eta_d$: dispersed phase viscosity,
v: interfacial tension, and
d: initial droplet diameter.

Figure 4:
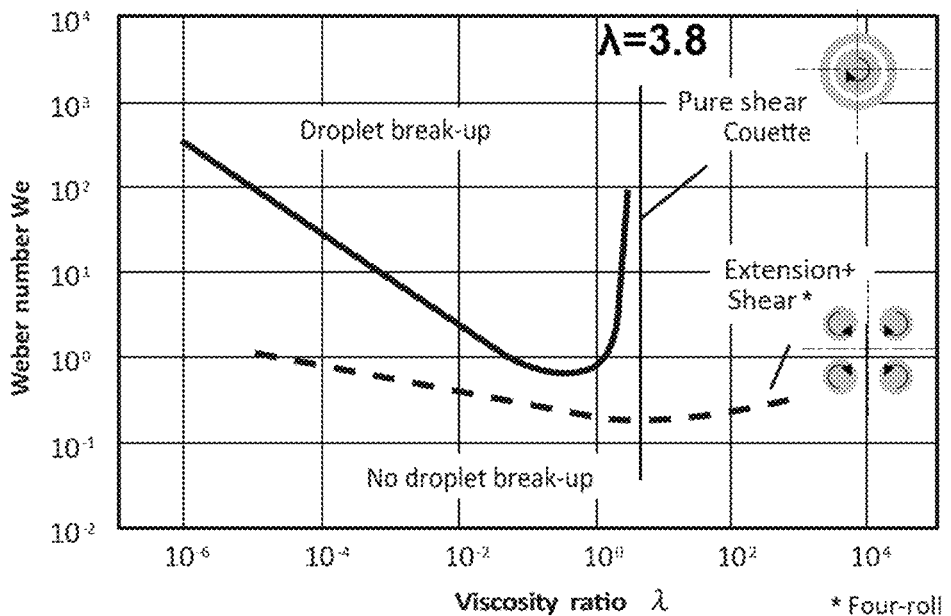
FIG. 4 is a graph showing a relationship between viscosity ratio and Weber number (capillary number) in a polymer blend.

FIG. 4 shows a relationship between viscosity ratio and Weber number We (capillary number Ca) in a polymer blend (H. P. Grace, Chemical Engineering Communications, Vol. 14 (3-6), (1982), pp. 225-277).

As shown in FIG. 4, in a shear flow, dispersion is impossible when the viscosity ratio λ is larger than 3.8. In contrast, in an extensional flow, even if the viscosity ratio λ is larger than 3.8, dispersion is possible, and the extensional flow is effective even in a polymer blend (liquid-liquid system).

Figure 5:
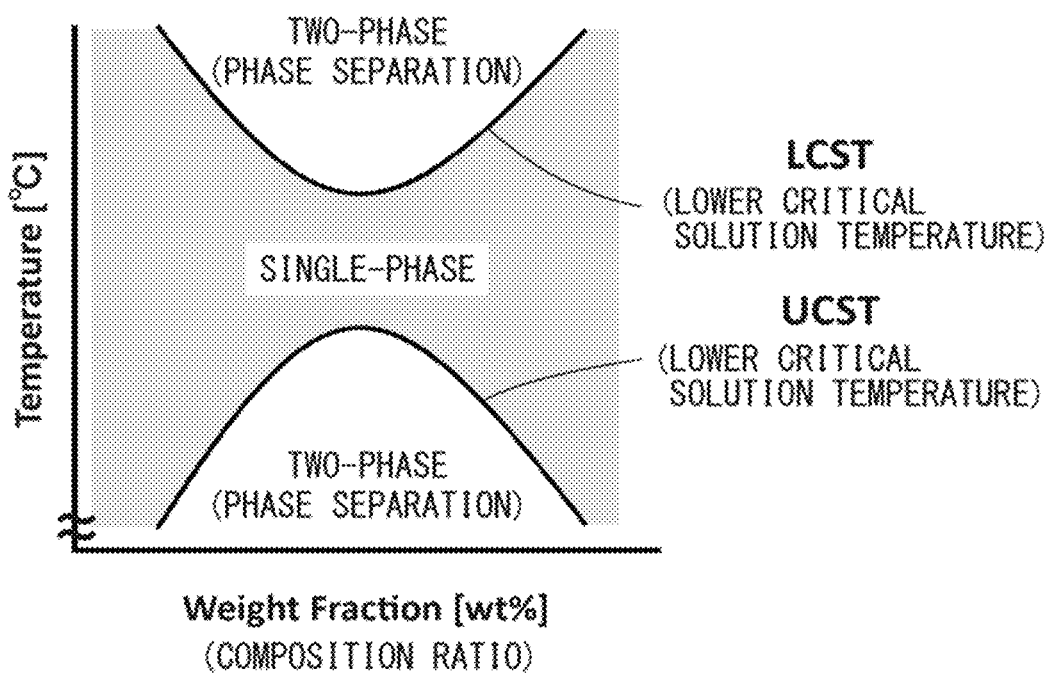
FIG. 5 is a phase diagram of a polymer blend.

In addition, as understood from the phase diagram of a polymer blend shown in FIG. 5, the compatibility of the polymer blend is determined depending on the temperature (however, the phase diagram range also changes depending on the pressure or shear). In addition, a polymer blend having an LCST-type phase diagram requires kneading at a temperature not higher than the LCST.

From the above, the present invention that shows excellent extensional flowability and can suppress shear heat generation is suitable for a polymer blend, in particular, a polymer blend having an LCST-type phase diagram.

A preferable example of the polymer blend is a polymer blend of polymethylmethacrylate (mother phase) and polycarbonate (dispersion phase). This polymer blend exhibits high heat resistance while maintaining the transparency and mechanical-physical properties by utilizing the high rigidity and transparency of the polymethylmethacrylate and the high impact resistance and heat resistance of the polycarbonate. This polymer blend has an LCST-type phase diagram, and the LCST thereof is about 285° C.

In addition, the multi-screw kneader of the present invention may be provided with a plurality of disk-shaped segments as described above, and the positions of the segments may be freely set.

Figure 6:
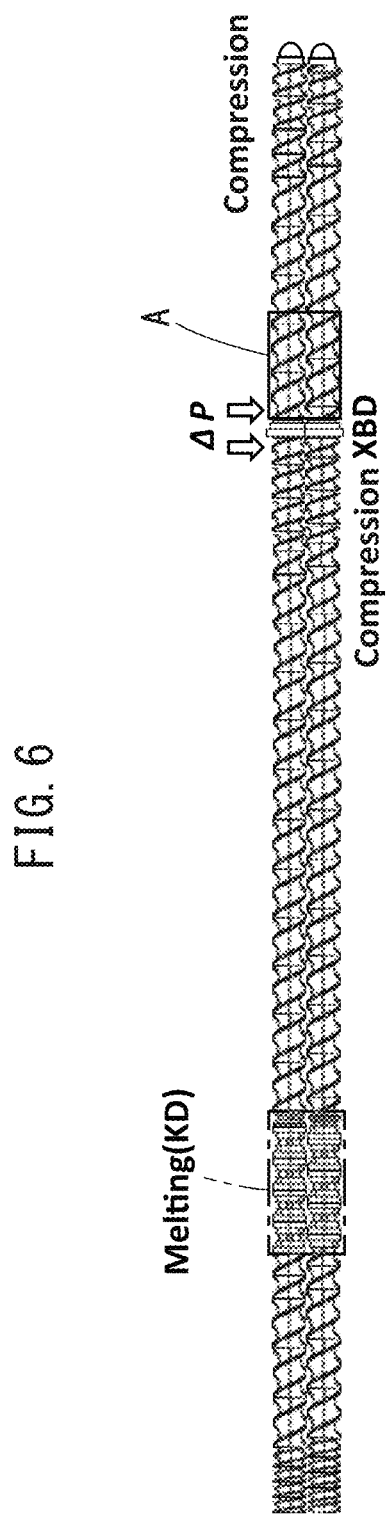
FIG. 6 is a cross-sectional schematic diagram illustrating an embodiment of a multi-screw kneader according to the present invention.
Figure 7:
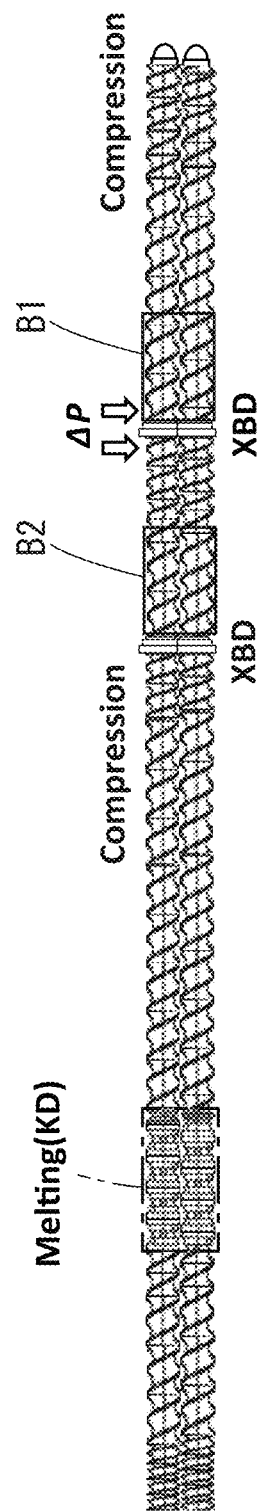
FIG. 7 is a cross-sectional schematic diagram illustrating an embodiment of a multi-screw kneader according to the present invention.

When devolatilization is performed by a vacuum pump, if a single disk-shaped segment is provided, as shown in FIG. 6, the vacuum pump is disposed at the position A. On the other hand, if a plurality of disk-shaped segments are disposed, as shown in FIG. 7, vacuum pumps can be disposed not only at the position B1 but also at the position B2 (the back of the disk-shaped segment) for devolatilization. Since the disk-shaped segment can be freely disposed, the invention also has an advantage of capable of freely changing the devolatilization position.

The method for producing a nano-composite of the present invention includes a step of loading nanoparticles as a resin additive using the multi-screw kneader of the present invention as described above.

The multi-screw kneader of the present invention has excellent nanodispersibility and is therefore particularly suitable for a method for producing a nano-composite.

In this case, although the resin is not particularly limited, examples thereof include common thermoplastic resins, such as general purpose plastics (such as polypropylene), general purpose engineering plastics, and super engineering plastics.

Although the nanoparticles are not particularly limited, examples thereof include carbon nanotubes, carbon nanofibers, cellulose nanofibers, graphenes, nanoclays, and carbon blacks.

EXAMPLES

The multi-screw kneader and the method for producing a nano-composite using the multi-screw kneader and the disk-shaped segment to be used therein according to the present invention will now be described using examples, but the present invention is not limited to these examples.

Example 1

The disk-shaped segment (hereinafter, abbreviated to "XBD" (Fixed Blistering Disk)) shown in FIG. 8 was disposed in the barrel of a twin-screw kneading extruder "ZSK18 MEGAlab" (manufactured by Coperion GmbH, screw diameter: 18 mm, L/D: 40), and kneading extrusion was performed.

Figure 8:
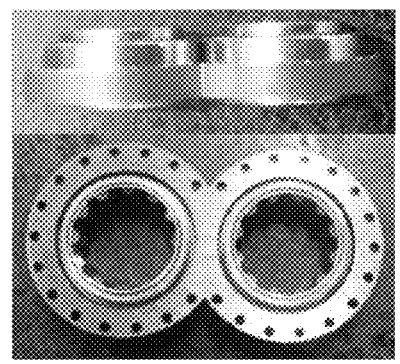
FIG. 8 is a photograph of the disk-shaped segment used in Example 1.

As shown in FIG. 8, the number of the small holes of the XBD was 30. The diameter of the small holes was 1 mm, and the width (depth) of the small holes in the axial direction was 3 mm (the width of the disk including the other portion in the axial direction was 7 mm).

The kneading material used included polypropylene (PP) "Prime Polypro (registered trademark) J108M" (manufactured by Prime Polymer Co., Ltd., homopolymer, MFR: 45 g/10 min (230° C.)) as the resin and carbon nanotubes (CNT) "NC7000" (manufactured by Nanocyl SA, multilayer carbon nanotubes, average diameter: 9.5 nm, average length: 1.5 μm, aspect ratio: 160) as the resin additive (nanofiller).

Figure 9:
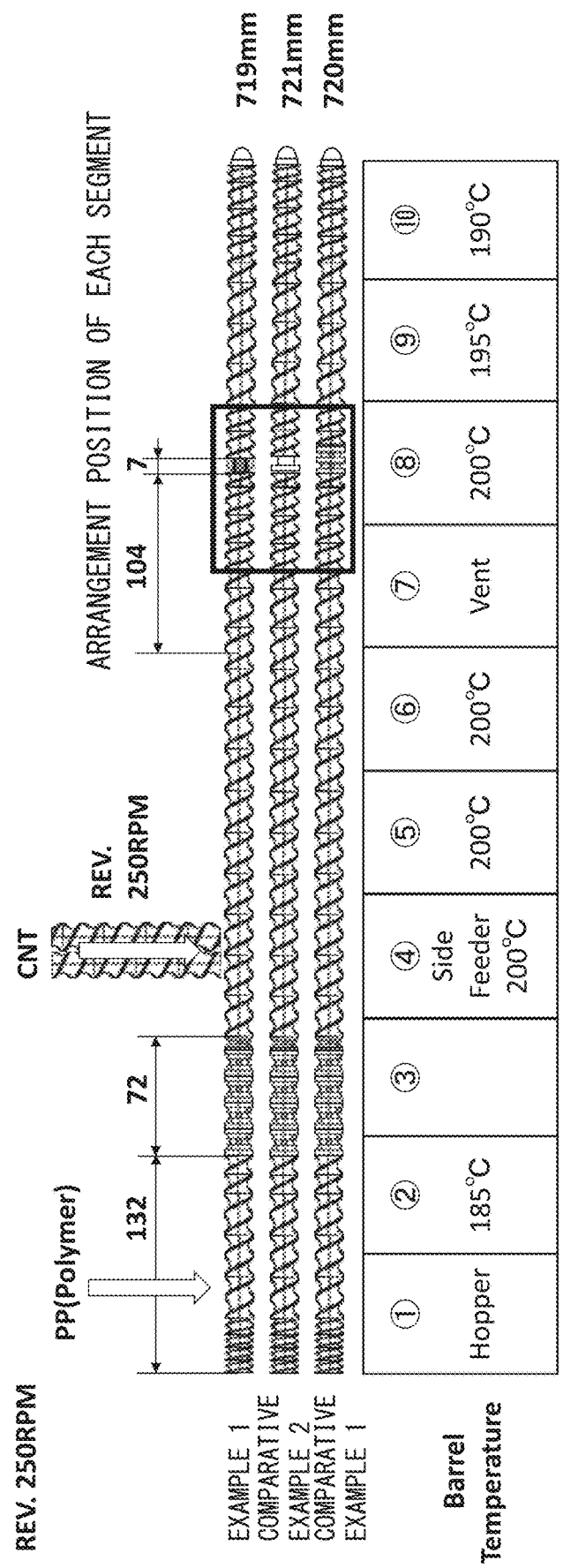
FIG. 9 is a schematic diagram of a twin-screw kneading extruder showing the arrangement positions of disk-shaped segments in Example 1 and Comparative Examples 1 and 2.

The arrangement positions of the XBDs in the twin-screw kneading extruder were as shown in FIG. 9.

The kneading extrusion conditions were a barrel temperature of 200° C., a screw rotation speed of 250 rpm, and a charging rate of 5.4 kg/h.

Comparative Example 1

Kneading extrusion was performed as in Example 1 except that the kneading disk (hereinafter, abbreviated to "KD") shown in FIG. 10 was used instead of the XBD.

Figure 10:
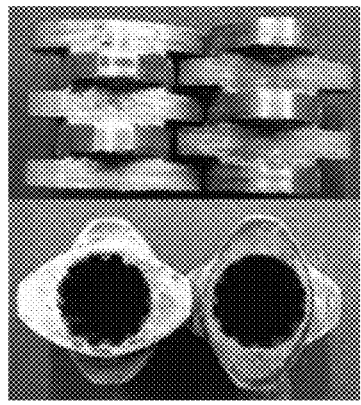
FIG. 10 is a photograph of the kneading disk used in Comparative Example 1.

As shown in FIG. 10, five disks were consecutively disposed shifting by 90 degrees, and the width (thickness) thereof in the axial direction was 16 mm in total.

FIG. 9 also shows the arrangement positions of the KDs in the twin-screw kneading extruder.

Comparative Example 2

Kneading extrusion was performed as in Example 1 except that the known blister disk (hereinafter abbreviated to "BD") shown in FIG. 11 was used instead of the XBD.

Figure 11:
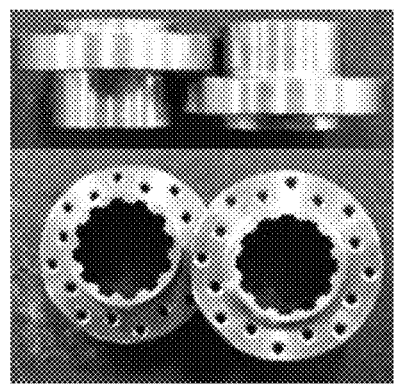
FIG. 11 is a photograph of a known blister disk used in Comparative Example 2.

As shown in FIG. 11, the number of small holes of the BD was 32 (=16×2). The diameter of the small holes was 1 mm, and the width (depth) of the small holes in the axial direction was 3 mm (the width of the disk including the other portion in the axial direction was 9 mm).

FIG. 9 also shows the arrangement positions of the BDs in the twin-screw kneading extruder.

[Kneading Characteristics Evaluation 1]

The kneading characteristics in Example 1 and Comparative Examples 1 and 2 were evaluated. The results are shown below.

Figure 12:
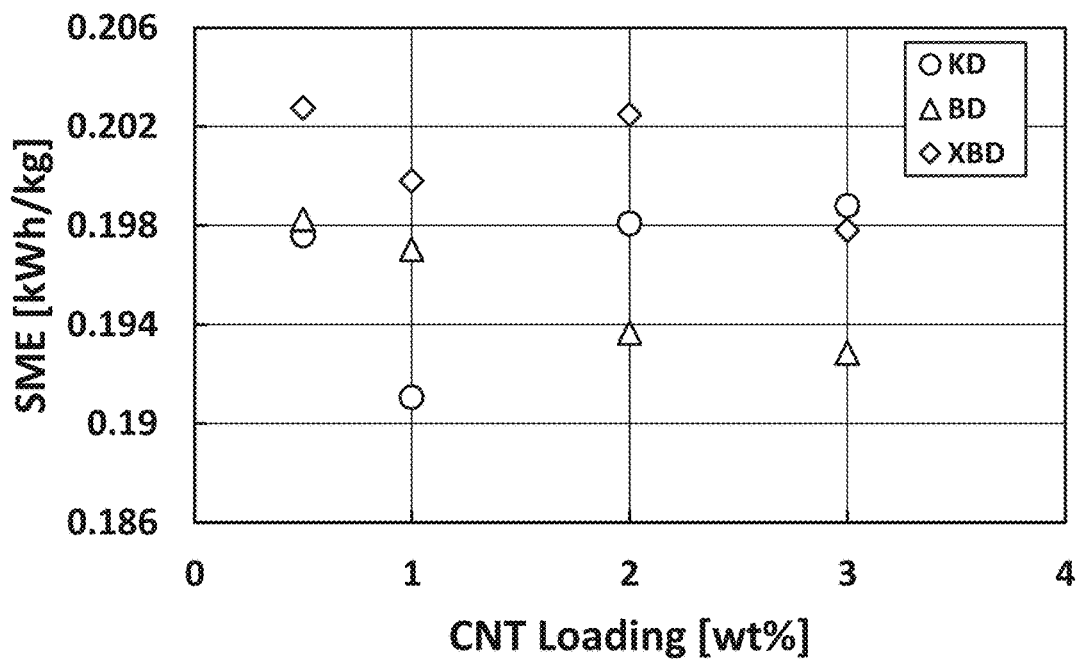
FIG. 12 is a graph showing a relationship between CNT loading ratio and specific mechanical energy in Example 1 and Comparative Examples 1 and 2.

The results in Example 1 and Comparative Examples 1 and 2 are shown in FIG. 12 where the horizontal axis shows the loading ratio (wt %) of CNT and the vertical axis shows the specific mechanical energy (SME) (kWh/kg).

Figure 13:
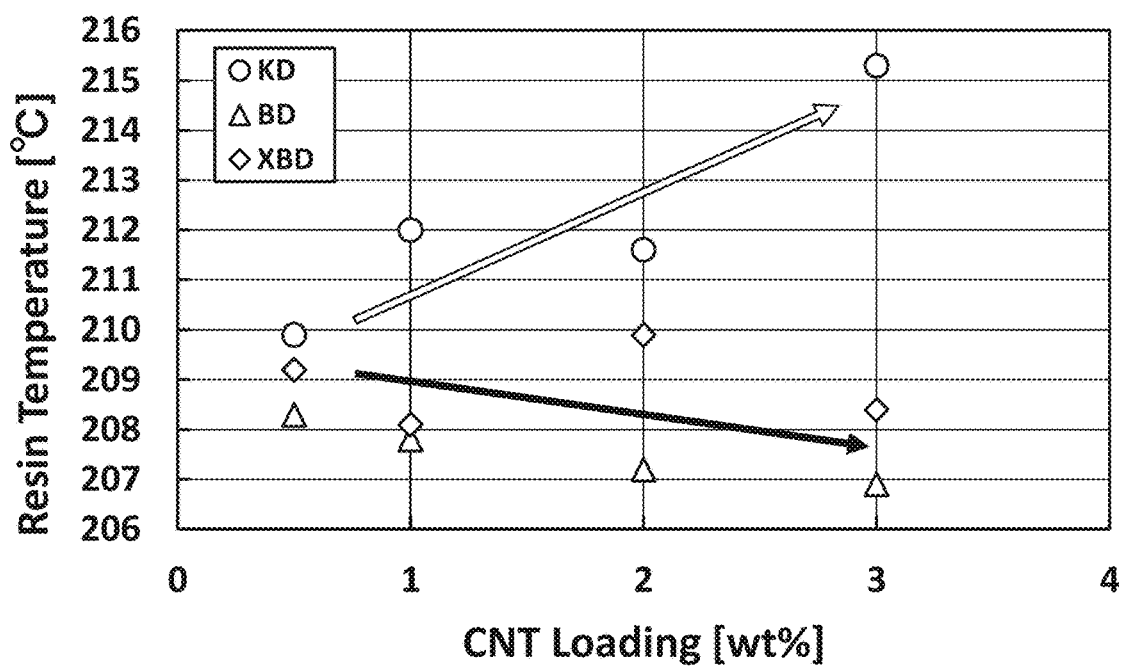
FIG. 13 is a graph showing a relationship between CNT loading ratio and resin temperature in Example 1 and Comparative Examples 1 and 2.

The results in Example 1 and Comparative Examples 1 and 2 are shown in FIG. 13 where the horizontal axis shows the loading ratio (wt %) of CNT and the vertical axis shows the resin temperature (° C.).

Figure 14:
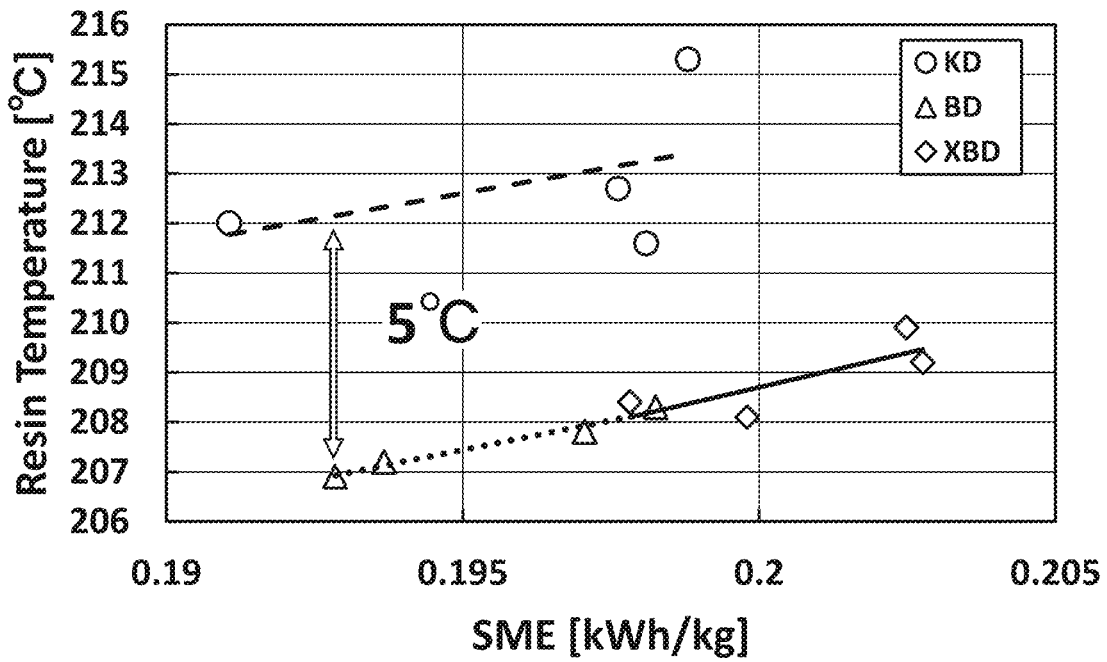
FIG. 14 is a graph showing a relationship between specific mechanical energy and resin temperature in Example 1 and Comparative Examples 1 and 2.

The results in Example 1 and Comparative Examples 1 and 2 are shown in FIG. 14 where the horizontal axis shows the SME (kWh/kg) and the vertical axis shows the resin temperature (° C.).

As shown in FIG. 12, the SME was the highest in Example 1 using XBD.

At the same time, it was demonstrated by FIG. 13 that an increase in the resin temperature was suppressed and the shear heat generation was suppressed in Example 1 using XBD and in Comparative Example 2 using BD, compared to Comparative Example 1 using KD.

As demonstrated by the results shown in FIGS. 12 to 14, in Example 1 using XBD, the exothermic temperature is low relative to the energy given. It can be understood that the above results are caused by the effect of the extensional flow.

[Kneading Characteristics Evaluation 2]

In order further clarify the kneading characteristics, simulation was performed as follows.

In the simulation, viscosity/viscoelasticity finite element analysis software "ANSYSPOLYFLOW 16.0" was used.

<Governing Equation>

$$\nabla \cdot v = 0 \qquad \text{[Math. 2]}$$

$$-\nabla p + \nabla \tau = 0 \qquad \text{[Math. 3]}$$

$$\tau = 2\eta D \qquad \text{[Math. 4]}$$

In the governing equations above,
v: velocity vector,
τ: residual stress tensor,
P: pressure,
η: viscosity, and
D: deformation velocity tensor.

<Presupposition>

Fluid is incompressible and non-Newtonian viscous.
Inertia and gravity are negligible.
Fluid adheres to the surface of a barrel.
A flow is constant in temperature.

<Strain Rate>

The shear rate is defined below.

$$D = \frac{1}{2}\begin{bmatrix} 0 & \dot{\gamma} & 0 \\ \dot{\gamma} & 0 & 0 \\ 0 & 0 & 0 \end{bmatrix} \Leftrightarrow \text{Shear rate } \dot{\gamma} = \sqrt{2II_D} \qquad \text{[Math. 5]}$$

The extension rate is defined below.

$$D = \begin{bmatrix} \dot{\varepsilon} & 0 & 0 \\ 0 & -\dot{\varepsilon}/2 & 0 \\ 0 & 0 & -\dot{\varepsilon}/2 \end{bmatrix} \Leftrightarrow \text{Extension rate } \dot{\varepsilon} = \frac{6III_D}{II_D} \qquad \text{[Math. 6]}$$

<Stress>

Figure 15:
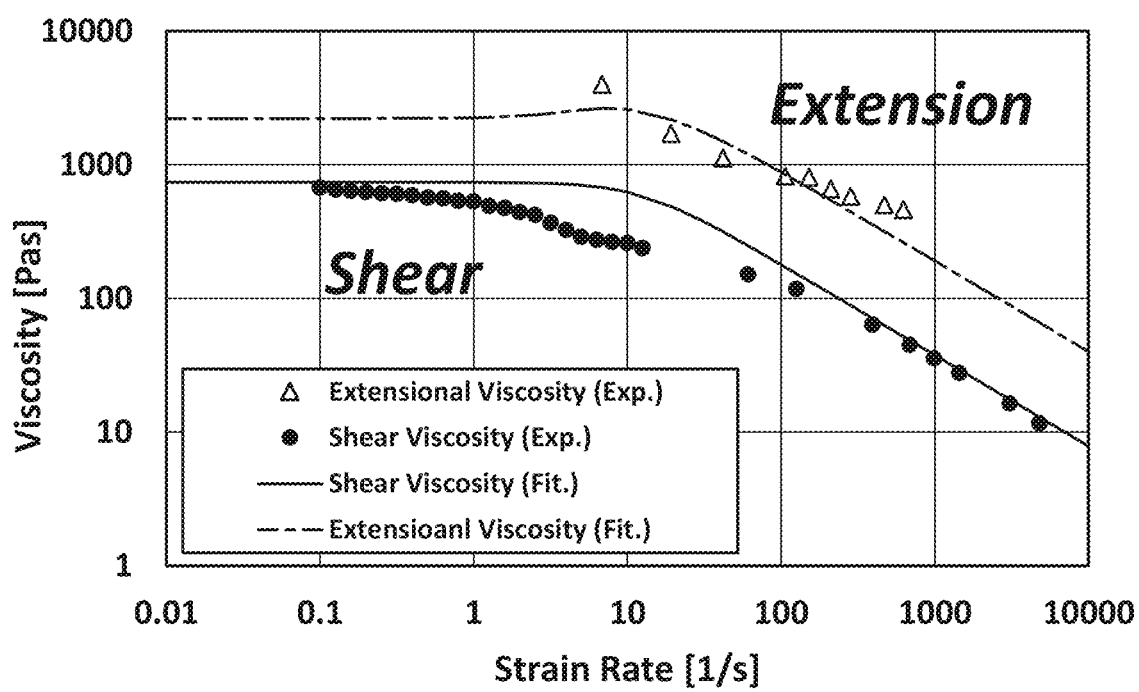
FIG. 15 shows viscosity data of CNT concentration of 1.0 wt % used in simulation of an example.

The shear viscosity and the extensional viscosity are defined respectively by the following expressions. These expressions are based on the shear viscosity curve and the extensional viscosity curve shown in FIG. 15 for a carbon nanotube concentration of 1.0 wt %.

$$\eta_S = \eta_0 \{1 + (\lambda\dot{\gamma})^2\}^{\frac{n-1}{2}} \qquad \text{[Math. 7]}$$

$$\eta_E = \eta_0 \left[3 + \delta\left\{1 - \frac{1}{\sqrt{1+(\lambda_1\dot{\varepsilon})^2}}\right\}\right][1+(\lambda_2\dot{\varepsilon})^2]^{\frac{m-1}{2}} \qquad \text{[Math. 8]}$$

The shear stress and the extensional stress are defined respectively by the following expressions.

$$\tau = \eta_S \cdot \dot{\gamma} \qquad \text{[Math. 9]}$$

$$\sigma = \eta_E \cdot \dot{\varepsilon} \qquad \text{[Math. 10]}$$

<Particle-Tracking>

Two thousand particles were poured from the inlet to the outlet under the following analysis conditions, and histograms of each parameter value received by the particles were created for the maximum shear stress, the maximum extensional stress, the retention time, and the pressure distribution.

(Analysis Conditions)

Flow rate: constant (5.4 kg/h),
Velocity on the surface of a flow channel: zero,
Pressure at the flow channel outlet: zero,
Viscosity: PP/CNT (1 wt %), 200° C., and
Rotation speed: 250 rpm (Model)

Figure 16:
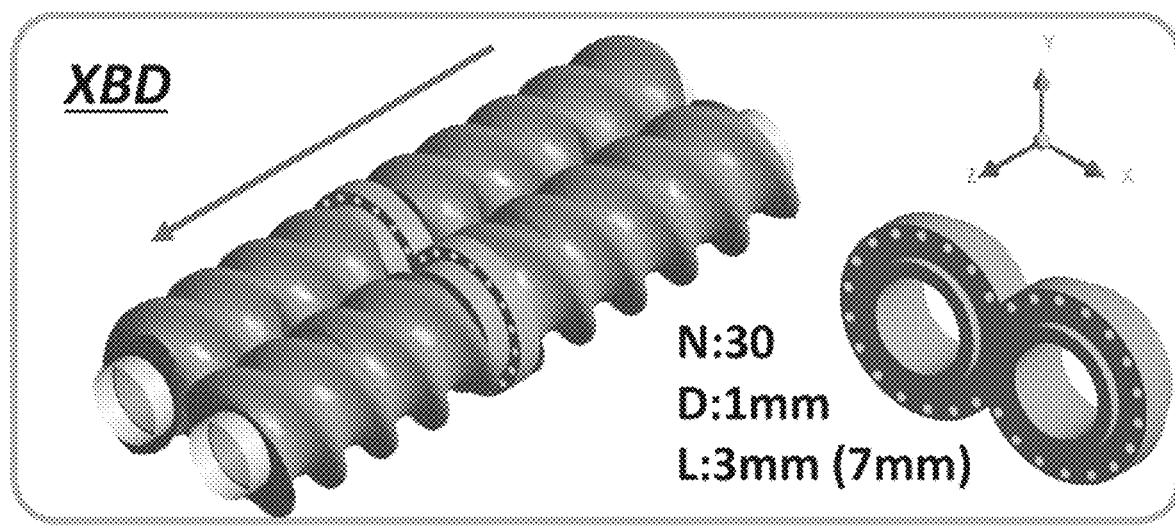
FIG. 16 shows 3D data of an XBD model in simulation of an example.
Figure 17:
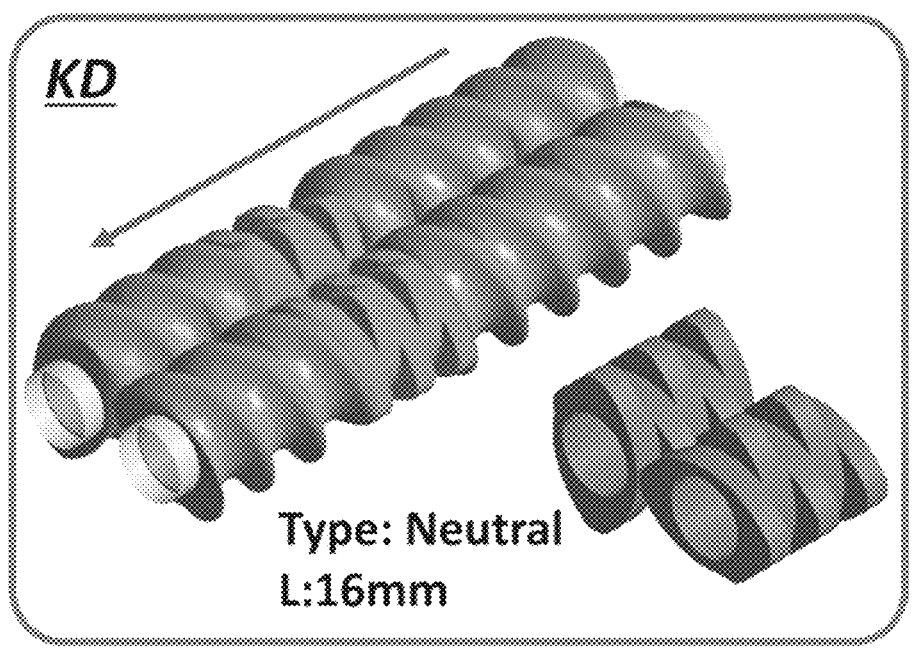
FIG. 17 shows 3D data of a KD model in simulation of an example.
Figure 18:
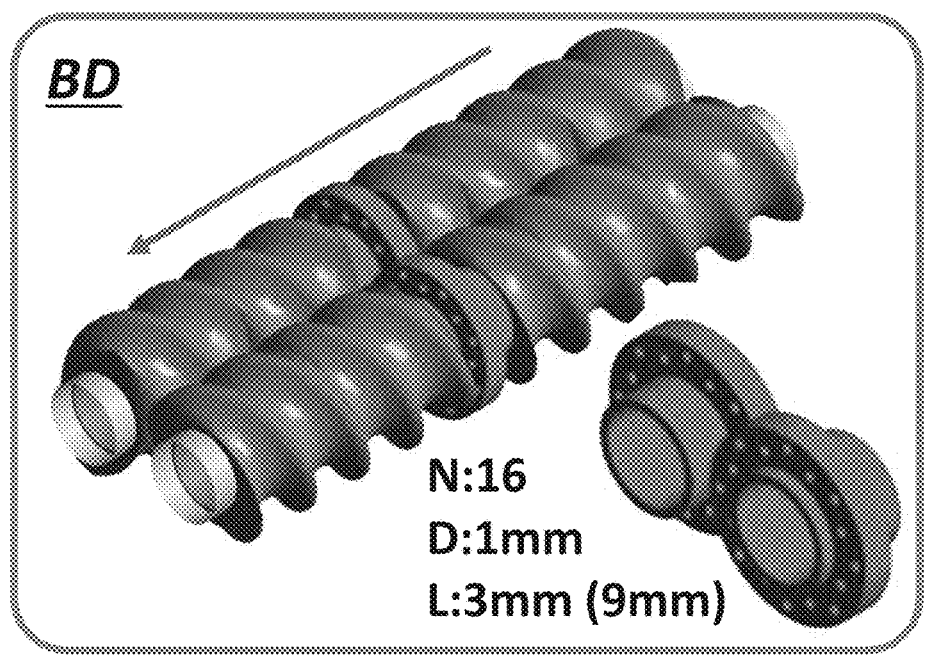
FIG. 18 shows 3D data of a BD model in simulation of an example.

The models in simulation are shown in FIGS. 16 to 18.

The model (XBD) shown in FIG. 16 corresponds to Example 1, the model (KD) shown in FIG. 17 corresponds to Comparative Example 1, and the model (BD) shown in FIG. 18 corresponds to Comparative Example 2.

<Simulation Results>

Figure 19:
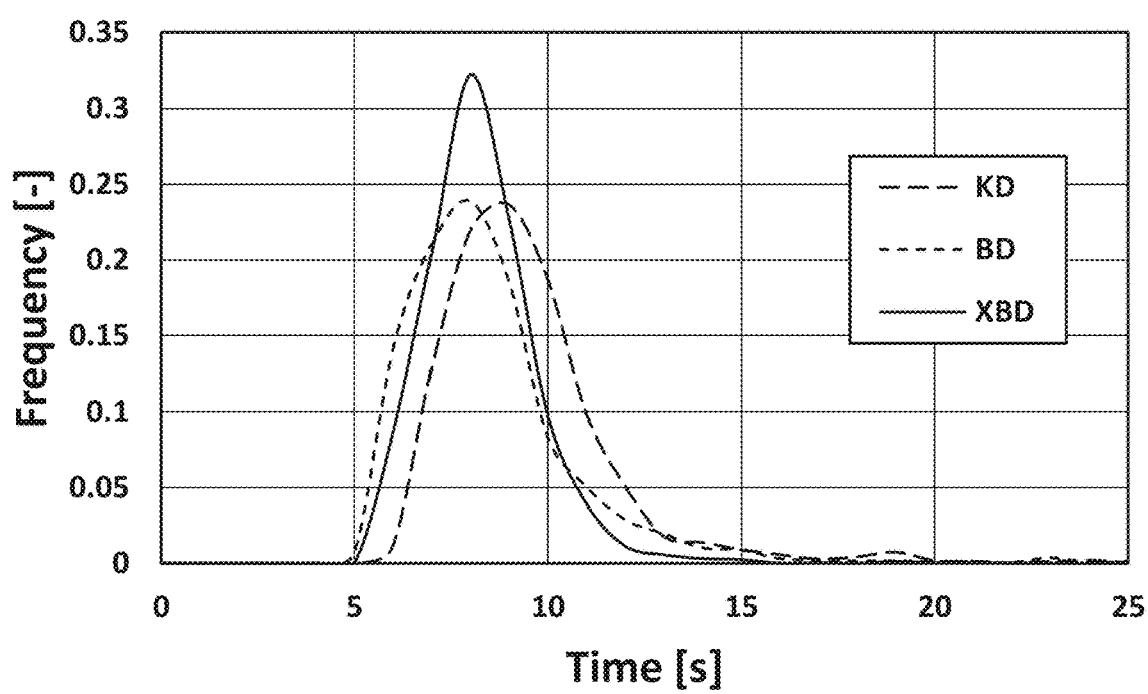
FIG. 19 is a graph showing the results regarding retention time in simulation of an example.

The results of retention time are shown in FIG. 19.

The results shown in FIG. 19 demonstrated that the retention times of BD and XBD were short compared to that of KD and that the distribution of XBD was sharper.

These results demonstrated that in XBD, the retention time is regulated, and the variation in the physical properties can be reduced.

Figure 20:
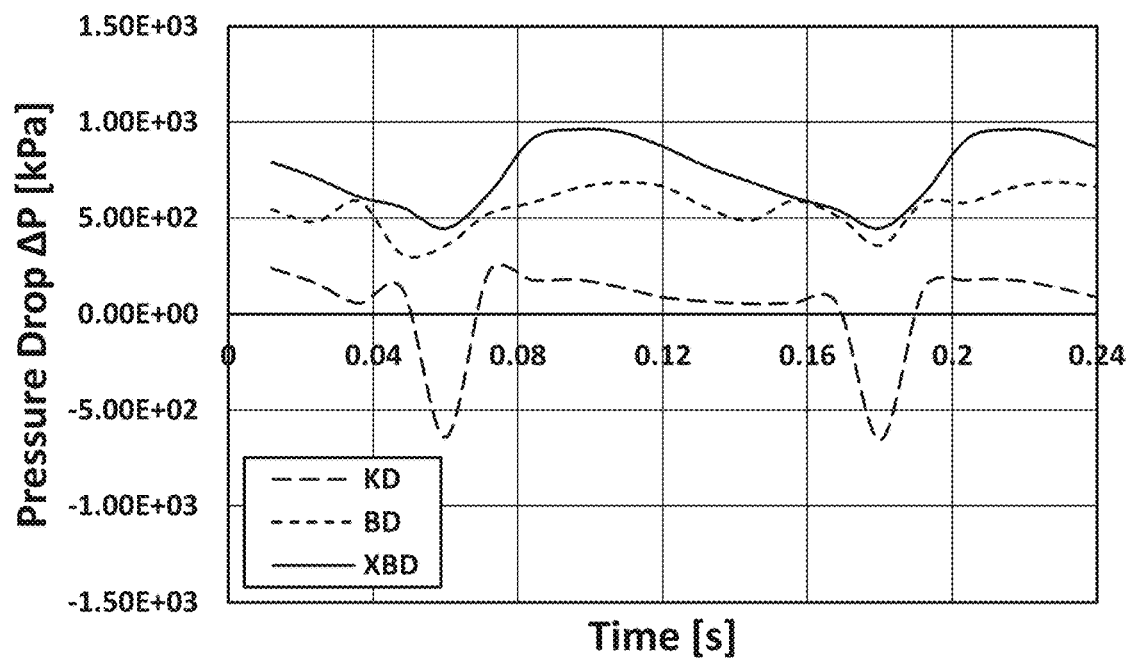
FIG. 20 is a graph showing the results regarding pressure drop in simulation of an example.

FIG. 20 shows the results of pressure distribution.

The results shown in FIG. 20 demonstrated that leakage between disks in XBD is suppressed compared to that in BD to increase the pressure drop (improvement of 40% or more). Incidentally, the pressure drop value necessary for dispersion of CNT is 1.5 to 2 MPa.

Figure 21:
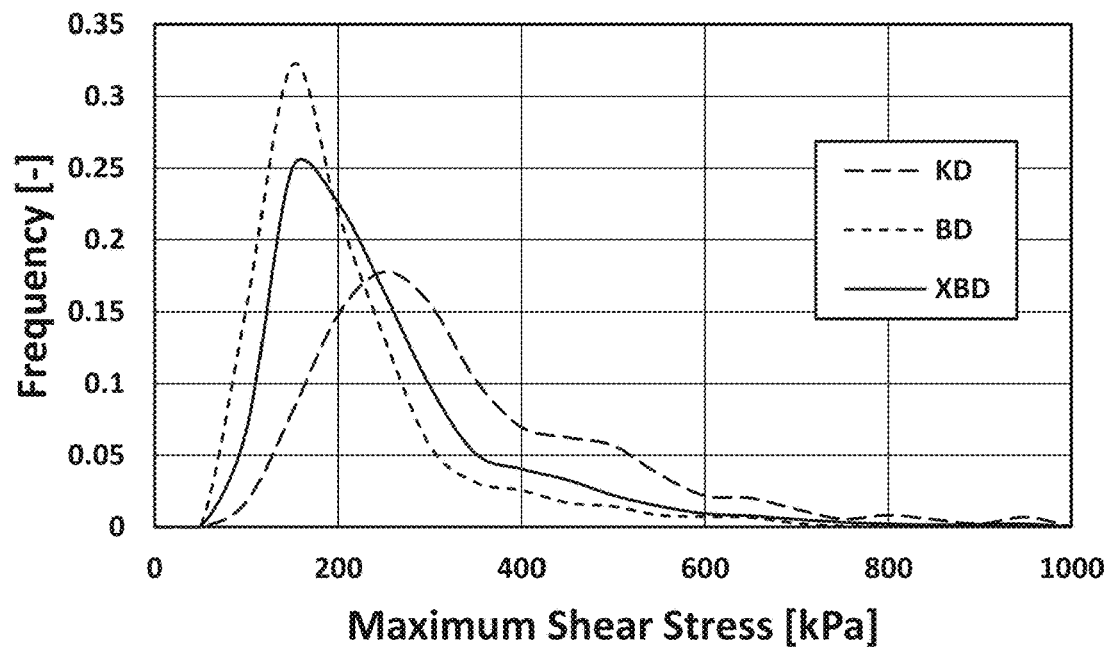
FIG. 21 is a graph showing the results regarding maximum shear stress in simulation of an example.
Figure 22:
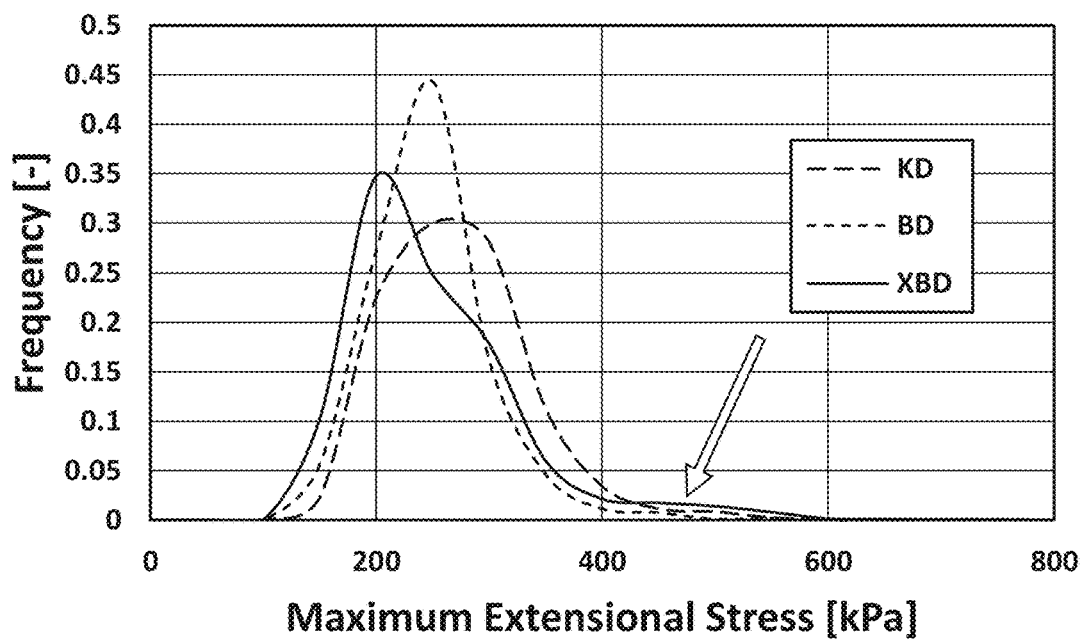
FIG. 22 is a graph showing the results regarding maximum extensional stress in simulation of an example.

FIGS. 21 and 22 show the results regarding the maximum shear stress and the maximum extensional stress.

The results shown in FIG. 21 demonstrated that the distribution of shear stress shifts to the lower stress side in BD and XBD compared to KD.

That is, shear kneading effect: KD>XBD>BD.

It is demonstrated that the shear heat generation is suppressed by XBD and BD compared to KD.

The results shown in FIG. 22 demonstrated that XBD can generate high extensional stress compared to KD and BD.

That is, extensional kneading effect: XBD>BD≥KD.

[Evaluation of Dispersion of CNT and Physical Properties of Nano-Composite]

The nano-composites prepared in Example 1 and Comparative Examples 1 and 2 were evaluated for the dispersion of CNT and the physical properties of the nano-composites as follows.

<Evaluation of Dispersion State of CNT>

(1) Optical Microscope and Scanning Electron Microscope (SEM)

The dispersibility was locally evaluated by an optical microscope and a scanning electron microscope (SEM).

Samples (thickness: 20 μm) were produced by a microtome "RM2265" (manufactured by Leica Microsystems), and cross-sections thereof were observed with a digital microscope "VHX-5000" (manufactured by Keyence Corporation) (magnification: 200×).

The area of aggregates (1 μm² or more) was measured by image analysis software "SigmaScan Pro5" (manufactured by HULINKS Inc.).

Figure 23:
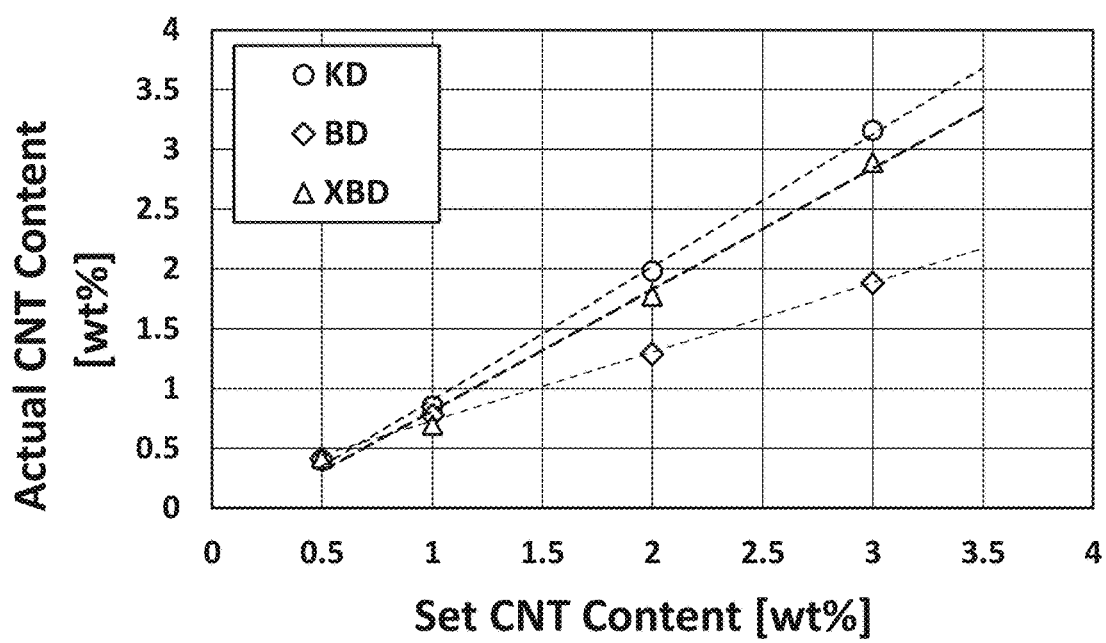
FIG. 23 is a graph showing a relationship between set value and actual value of CNT content in Example 1 and Comparative Examples 1 and 2.

Relationships between the set value and the actual value of CNT content in Example 1 (XBD), Comparative Example 1 (KD), and Comparative Example 2 (BD) are shown in Table 1 and FIG. 23.

TABLE 1

| CNT content set value (wt %) | CNT content actual value (wt %) | | |
|---|---|---|---|
| | Example 1 (XBD) | Comparative Example 1 (KD) | Comparative Example 2 (BD) |
| 0.5 | 0.42 ± 0.03 | 0.40 ± 0.05 | 0.41 ± 0.04 |
| 1.0 | 0.70 ± 0.04 | 0.86 ± 0.04 | 0.79 ± 0.04 |
| 2.0 | 1.78 ± 0.06 | 1.98 ± 0.02 | 1.29 ± 0.07 |
| 3.0 | 2.89 ± 0.04 | 3.16 ± 0.02 | 1.88 ± 0.04 |

These results demonstrated that the CNT contents in Examples and Comparative Examples differ from one another. This probably indicates the retention states of CNT are different from each other. In particular, Comparative Example 2 (BD) showed a decreasing tendency.

FIG. 24 shows the size distribution of aggregates when the CNT content (set value) was 0.5 wt %.

This result demonstrated that the dispersion state of CNT in Example 1 (XBD) was good compared to Comparative Example 1 (KD).

Figure 25:
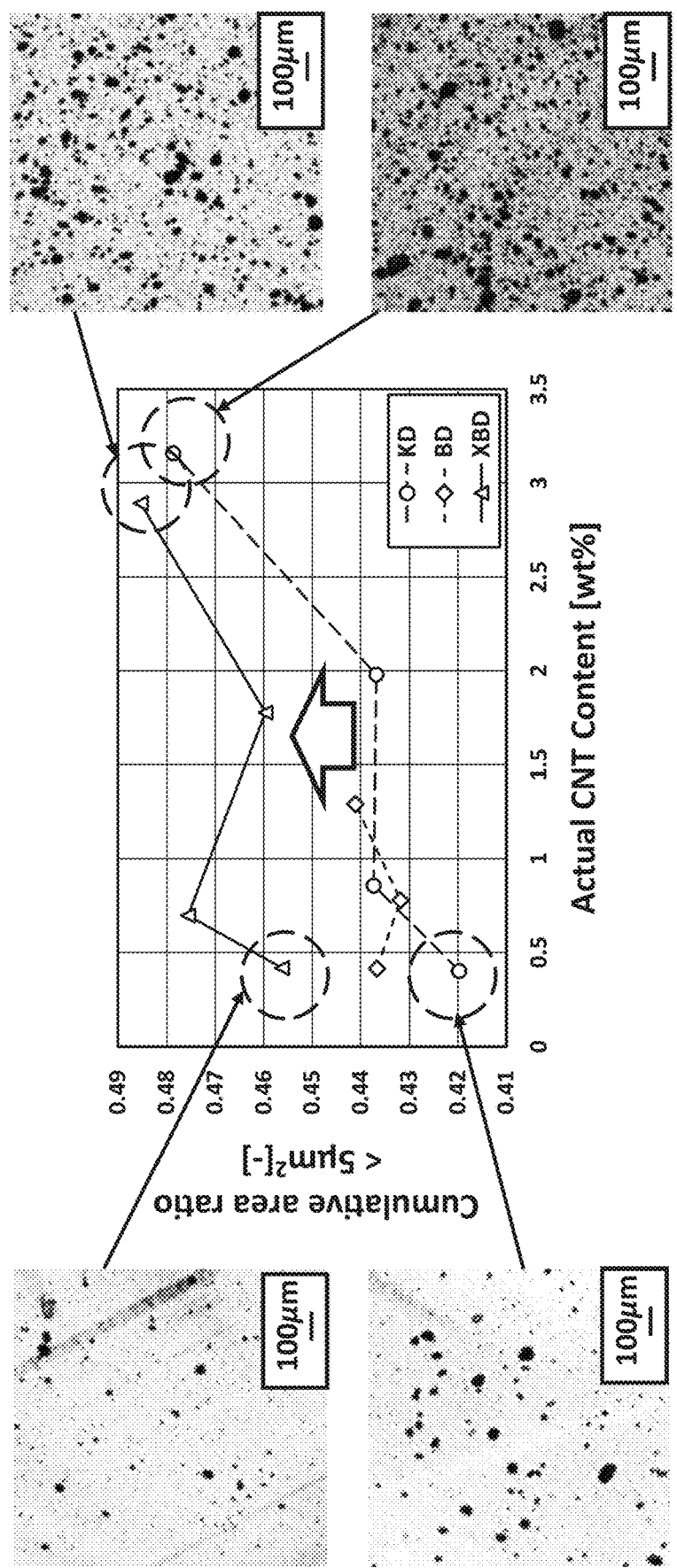
FIG. 25 is a graph showing the rate of CNT aggregates of 5 μm$^2$ or less in Example 1 and Comparative Examples 1 and 2.

In addition, the rate of CNT aggregates of 5 μm² or less (1 μm² or more) was calculated, and the result is shown in FIG. 25.

This result indicates:

dispersion state: Example 1 (XBD)>Comparative Example 2 (BD)>Comparative Example 1 (KD).

It was demonstrated that the dispersibility in Example 1 was improved by 8% compared to Comparative Example 1, in particular, the dispersion state is good in a low concentration.

(2) Dynamic Viscoelasticity Measurement

The whole dispersion (the network state of CNT) was evaluated by frequency-dependence measurement (storage elastic modulus G', complex viscosity |η*|).

Evaluation was performed using a "HAAKE™ MARS™ rheometer" (manufactured by Thermo Fisher Scientific) as follows.

Flat plate/flat plate: diameter: 20 mm, thickness: 1 mm,
Frequency-dependence measurement: 0.1 to 350 rad/s, * linear viscoelastic region (strain: 10%), and
Temperature: 220° C.

Figure 26:
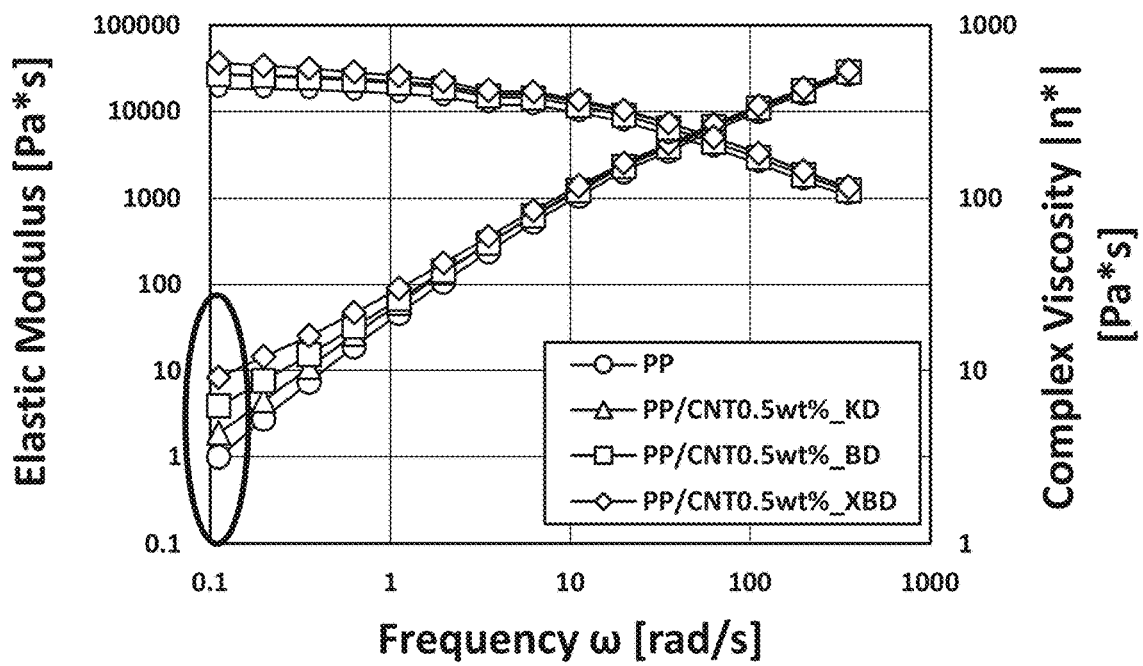
FIG. 26 is a graph showing the results of dynamic viscoelasticity measurement in Example 1 and Comparative Examples 1 and 2.
Figure 27:
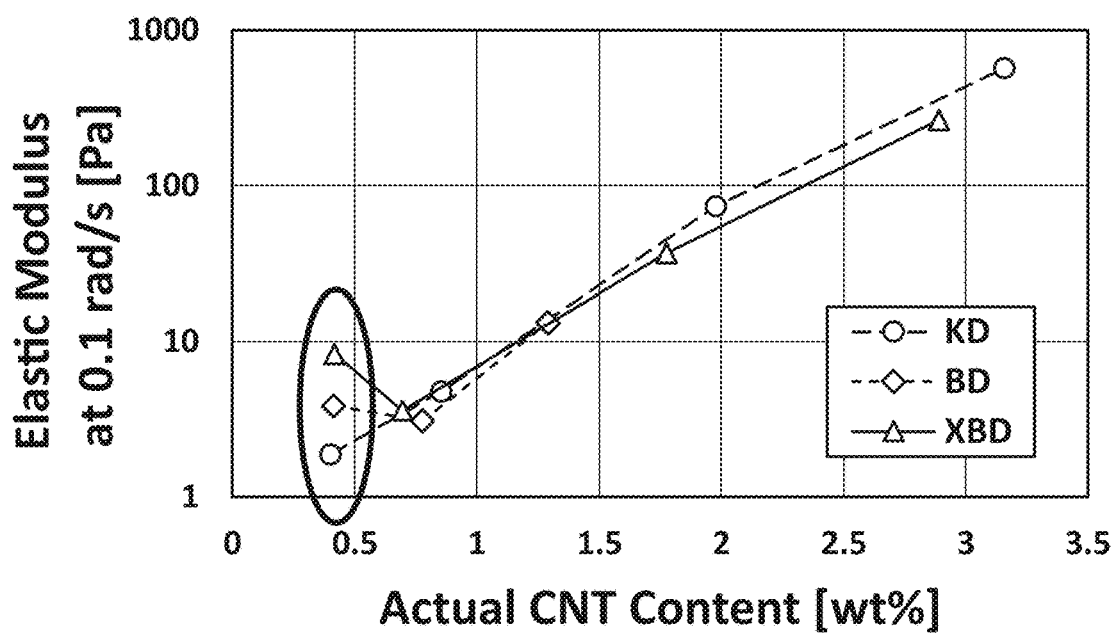
FIG. 27 is a graph showing the results of dynamic viscoelasticity measurement in Example 1 and Comparative Examples 1 and 2.

FIGS. 26 and 27 show the measurement results.

The differences of dispersion among Examples and Comparative Examples were remarkable near 0.5 wt %.

Dispersion state: Example 1 (XBD)>Comparative Example 2 (BD)>Comparative Example 1 (KD).

The results had the same tendency as the results of observation by an optical microscope.

(3) Conductivity Test

The whole CNT dispersion was evaluated by measuring the volume resistivity (in accordance with JIS K7194).

This measurement was performed using a resistivity meter "Hiresta UP" (manufactured by Mitsubishi Chemical Analytech Co., Ltd.).

Figure 28:
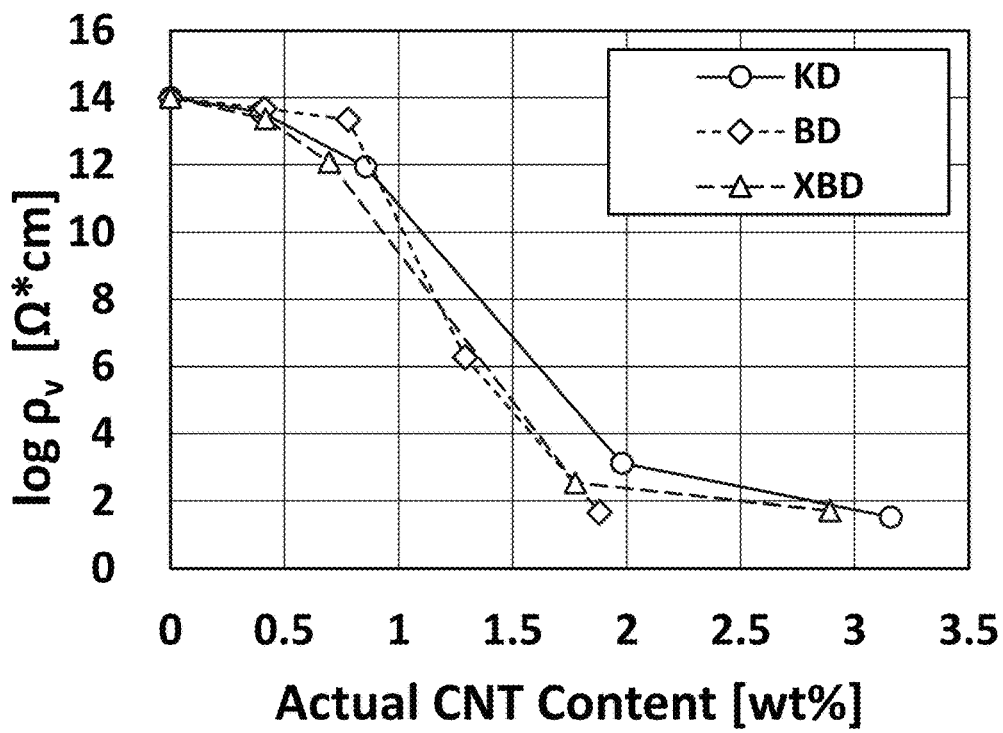
FIG. 28 is a graph showing the results regarding conductivity in Example 1 and Comparative Examples 1 and 2.

FIG. 28 shows the measurement results.

It was demonstrated that the volume resistivity of Example 1 (XBD) is lower than that of Comparative Example 1 (KD).

Here, since the network of CNT is approximately proportional to the dispersion state (see Tatsuhiro Takahashi, Takeshi Yasuda, Takahiro Ookubo, Hiroshi Awano and Koichiro Yonetake, "Functionalization of carbon nanotube/polymer composite", TANSO, Vol. 2006, (2006), No. 223, pp. 194-205), the dispersion is promoted as the value of the volume resistivity is smaller.

Accordingly,

Dispersion state: Example 1 (XBD)>Comparative Example 1 (KD)>Comparative Example 2 (BD).

<Evaluation of Mechanical Strength>

(4) Crystallinity

Crystallinity was measured using a differential scanning calorimeter (DSC) "Q 1000" (manufactured by TA Instrument) under the following conditions.

Temperature rising and falling: 20° C. (K)/min, range of 0° C. to 200° C.,
Measurement of crystallinity (1st cooling and 2nd heating time), and
Under nitrogen atmosphere.

Figure 29:
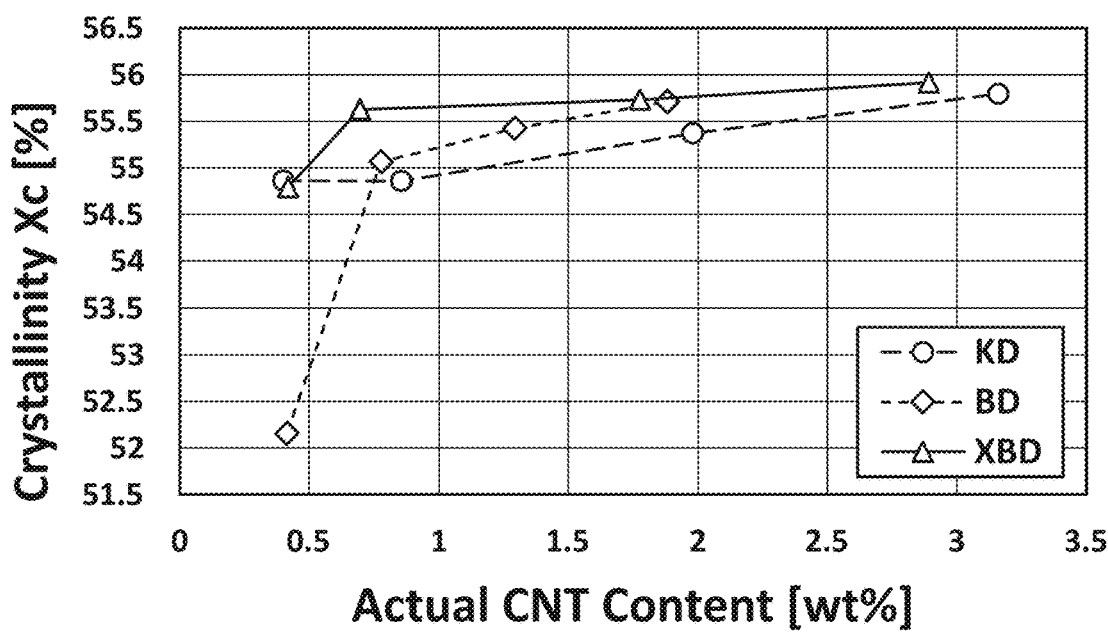
FIG. 29 is a graph showing the results regarding crystallinity in Example 1 and Comparative Examples 1 and 2.

FIG. 29 shows the measurement results.

Xc was calculated by the following expression.

$$\chi_C = \frac{\Delta H_m}{(1-\alpha) \cdot \Delta H_m^0} \times 100 \qquad [\text{Math. 11}]$$

In the expression above, $\Delta H_m$: melting enthalpy,
$\Delta H_m^0$: enthalpy of 100% crystalline polymer (*$\Delta H_m^0$ of polypropylene: 207.1 (J/g)), and
α: CNT loading ratio (wt %).

Improvement in crystallinity of the matrix by CNT leads to improvement in mechanical strength.

Accordingly, mechanical strength: Example 1 (XBD)>Comparative Example 2 (BD)>Comparative Example 1 (KD).

(5) Tensile Test

JIS K7161 1A test pieces were produced using an injection molding machine "PLASTR ET-40V" (manufactured by Toyo Machinery & Metal Co., Ltd.).

The elastic modulus and the tensile strength of five pieces were measured in accordance with JIS K7161.

Figure 30:
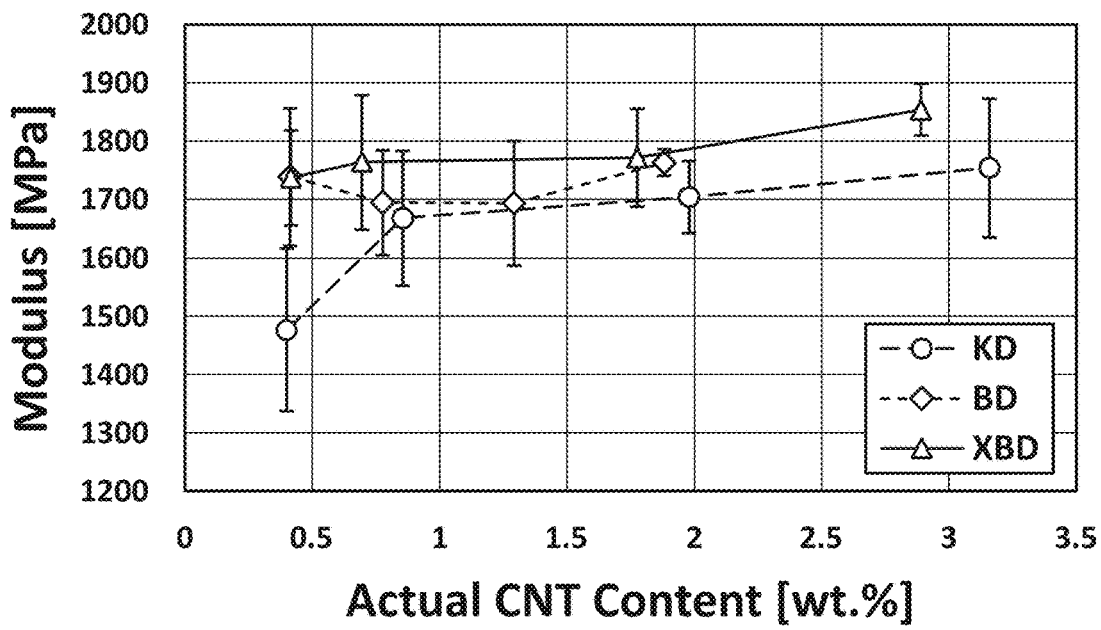
FIG. 30 is a graph showing the results regarding elastic modulus in Example 1 and Comparative Examples 1 and 2.
Figure 31:
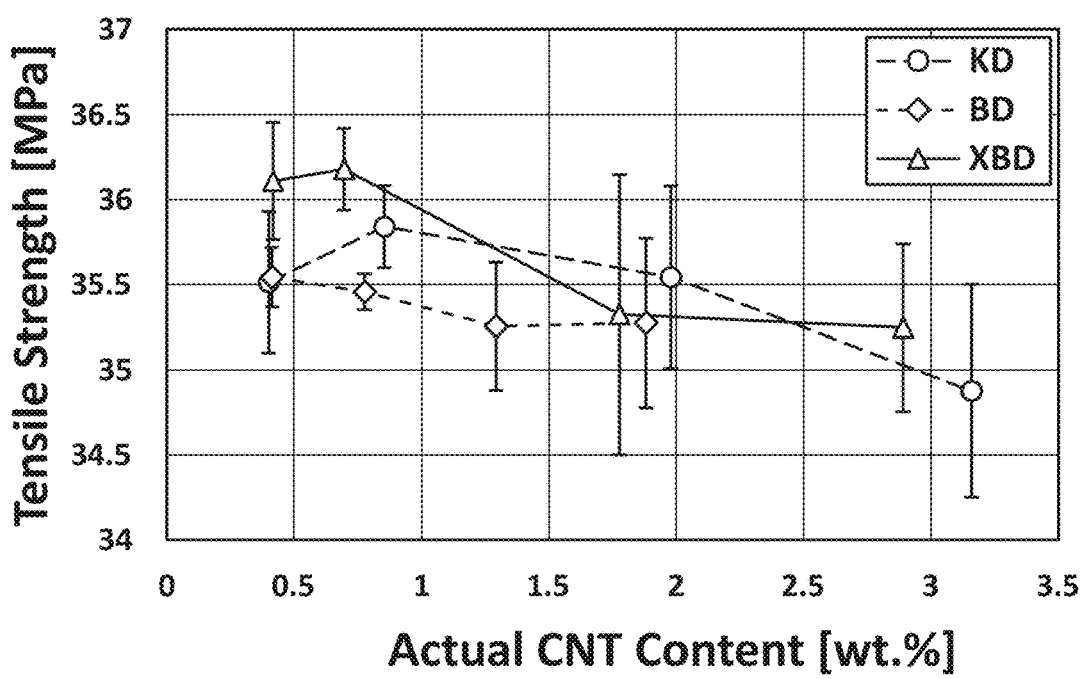
FIG. 31 is a graph showing the results regarding tensile strength in Example 1 and Comparative Examples 1 and 2.

FIGS. 30 and 31 show the measurement results.

These results demonstrated that the elastic modulus and the tensile strength were both improved in Example 1 (XBD).

Accordingly, mechanical strength: Example 1 (XBD)>Comparative Example 2 (BD)>Comparative Example 1 (KD).

It can be understood that the above results were caused by suppression of the thermal deterioration of the polypropylene itself and improvement in the crystallinity with the improvement of the dispersibility. In particular, the effect of improving the mechanical strength was high at the lower concentration side.

[Conclusion of the Results of Each Evaluation Test]

The results above are collectively shown in FIG. 32.

The multi-screw kneader and the method for producing a nano-composite using the multi-screw kneader and a disk-shaped segment to be used therein of the present invention can avoid leakage of the resin between disks, unlike Comparative Example 2, and are specialized in extensional flow while suppressing shear (suppressing shear heat generation).

Examples 2 to 8

Kneading extrusion was performed using a twin-screw kneading extruder "ZSK18 MEGAlab" (manufactured by Coperion GmbH, screw diameter: 18 mm, L/D: 40) provided with a disk-shaped segment in the barrel. The details are as follows.

The kneading material used included a cycloolefin polymer (COP) "ZEONOR (registered trademark) 1420R" (manufactured by Zeon Corporation, amorphous resin, glass transition point: 136° C., melt flow rate: 20 g/10 min (280° C.) as the resin and monolayer carbon nanotubes (SWCNT) "ZEONANO (registered trademark)" (manufactured by Zeon Nano Technology Co., Ltd., average diameter: 3 to 5 nm, average length: 100 to 600 μm) as the resin additive (nanofiller).

Figure 33:
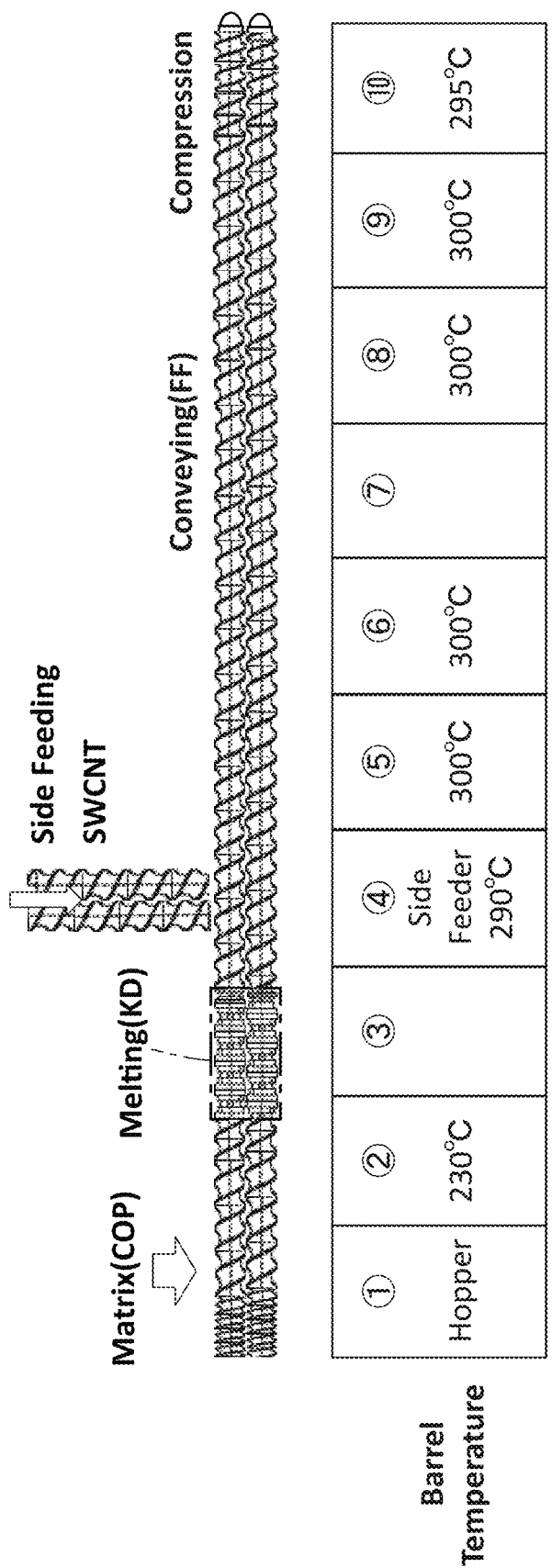
FIG. 33 is a schematic diagram of a twin-screw kneading extruder used in master-batch preparation in Examples 2 to 8.

A master batch was produced by supplying the COP from a hopper using a twin-screw kneading extruder (of which a schematic diagram is shown in FIG. 33), loading the SWCNT from an additive input port, and performing kneading extrusion. The "Melting (KD)" in the diagram is a kneading disk (that shown in FIG. 10) used for melting.

Figure 34:
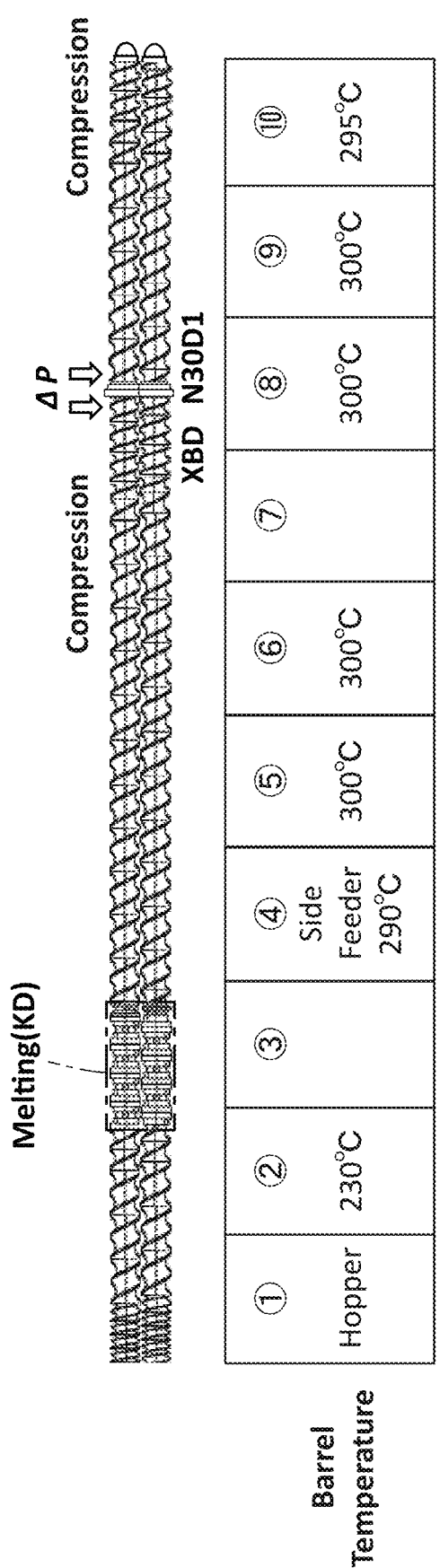
FIG. 34 is a schematic diagram of a twin-screw kneading extruder used for melting and kneading a kneading material adjusted in concentration in Examples 2 to 8.
Figure 35:
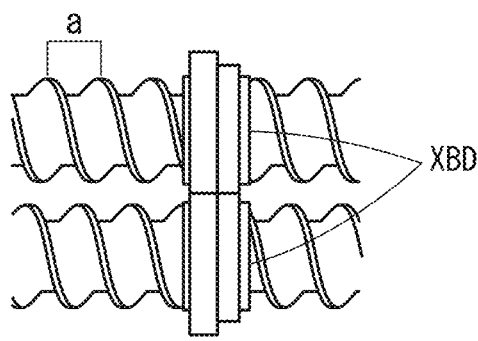
FIG. 35 is an explanatory diagram for clarifying the significance of the screw pitch of the disk-shaped segment used in Examples 2 to 8.

Subsequently, the concentration of the SWCNT was adjusted to 0.5 wt % by adding the COP to the master batch, followed by kneading extrusion using a twin-screw kneading extruder (of which a schematic diagram is shown in FIG. 34) provided with XBD. The screw was a full-flight screw (FF), and the screw pitch (the interval indicated by "a" in FIG. 35) was 12 mm. The "Melting (KD)" in the diagram is a kneading disk (that shown in FIG. 10) used for melting.

The XBD was that shown in FIG. 8. In the XBD, the number of small holes was 30, the diameter of the small holes was 1 mm, and the width (depth) of the small holes in the axial direction was 3 mm (the width of the disk including the other portion in the axial direction was 7 mm).

The kneading extrusion conditions in the above-mentioned operation were as shown in the following table.

TABLE 2

| | Barrel temperature T [° C.] | Screw rotation Ns [min$^{-1}$] | Throughput Q [kg/h] | Q/Ns |
|---|---|---|---|---|
| Example 2 | 270 | 300 | 4.0 | 0.013 |
| Example 3 | 285 | | | |
| Example 4 | 300 | | | |

TABLE 2-continued

| | Barrel temperature T [° C.] | Screw rotation Ns [min$^{-1}$] | Throughput Q [kg/h] | Q/Ns |
|---|---|---|---|---|
| Example 5 | 300 | 200 | 4.0 | 0.020 |
| Example 6 | | 500 | | 0.008 |
| Example 7 | 300 | 300 | 2.0 | 0.007 |
| Example 8 | | | 6.0 | 0.020 |

Examples 9 to 15

Kneading extrusion was performed as in Examples 2 to 8 except that XBD having 8 small holes was used.

Examples 16 to 22

Kneading extrusion was performed as in Examples 2 to 8 except that the screw pitch (see FIG. 35) was changed to 8 mm.

[Simulation of Kneading Extrusion of COP and SWCNT]

Kneading extrusion of COP and SWCNT was simulated separately from Examples 2 to 22. Specifically, the simulation was performed as follows.

Simulation was performed using viscosity/viscoelasticity finite element analysis software "ANSYSPOLYFLOW 18.0".

<Governing Equation>

$$V \cdot v + \frac{\beta}{\eta_s} \Delta p = 0 \qquad \text{[Math. 12]}$$

$$H(v-\overline{V})+(1-H)(-\nabla p-\nabla \cdot T-\rho a)=0 \qquad \text{[Math. 13]}$$

$$T=2\eta_s(\dot{\gamma},T)D \qquad \text{[Math. 14]}$$

In the governing equations above,
v: velocity vector,
β: relative compression factor,
η: shear viscosity,
p: pressure,
H: step function,
ρa: inertia term,
T: residual stress tensor, and
D: deformation velocity tensor.

<Material Parameter (Using Carreau-Model)>

$$\eta(\dot{\gamma}) = \eta_0\{1 | (\lambda\dot{\gamma})^2\}^{\frac{n-1}{2}} \qquad \text{[Math. 15]}$$

[Measurement and Evaluation]

<Pressure Drop>

Regarding Examples 2 to 8, two pairs of pressure sensors (NP462) manufactured by Dynisco were attached to a self-making barrel for a twin-screw extruder, and the pressure drop (ΔP) was measured in front and behind the XBD.

<Shear Rate and Extension Rate at Disk-Shaped Segment Through-Hole Portion>

The shear rate and the extension rate at the disk-shaped segment through-hole portion were analyzed by simulation.

<Dispersion State of SWCNT in COP>

From four viewpoints, optical microscopic observation, melt viscoelastic properties, surface resistivity, and tensile properties, evaluation was performed. Specifically, the evaluation was performed as follows.
(1) Optical Microscope and Scanning Electron Microscope (SEM)

The dispersibility was locally evaluated by an optical microscope and a scanning electron microscope (SEM).

Samples (thickness: 2 μm) were produced by a microtome (manufactured by Nihon Microtome Laboratory, Inc., model: RMD-5), and cross-sections thereof were observed with an optical microscope (manufactured by Meiji Techno Co., Ltd., MT9400) (magnification: 230×).

The cross-sectional observation of tensile test pieces was performed by SEM observation using a scanning electron microscope FE-SEM (manufactured by JEOL Ltd., JSM-7001FD) at an acceleration voltage of 10.0 kV.

The area of aggregates (1 μm² or more) was measured by image analysis software "SigmaScan Pro5" (manufactured by HULINKS Inc.).

(2) Dynamic Viscoelasticity Measurement

The whole dispersion (the network state of CNT) was evaluated by frequency-dependence measurement (storage elastic modulus G', complex viscosity |η*|).

Evaluation was performed using "Bohlin GEMINI II" (manufactured by Malvern Instruments Ltd.) as follows.

Flat plate/flat plate: diameter: 20 mm, thickness: 1.5 mm, Frequency-dependence measurement: 0.1 to 100 rad/s, * linear viscoelastic region (strain: 2%), and Temperature: 210° C.

(3) Conductivity Test

The whole SWCNT dispersion was evaluated by measuring the surface resistivity (in accordance with JIS K7194).

This measurement was performed using a resistivity meter "Loresta GX MCP-T700" (manufactured by Mitsubishi Chemical Analytech Co., Ltd.).

(4) Tensile Test

JIS K7161 1A test pieces were produced using an injection molding machine "PLASTR ET-40V" (manufactured by Toyo Machinery & Metal Co., Ltd.).

The elastic modulus, the tensile strength, and the fracture elongation of seven pieces were measured in accordance with JIS K7161.

[Results and Consideration]
<Tendency of Pressure Drop>

Figure 36:
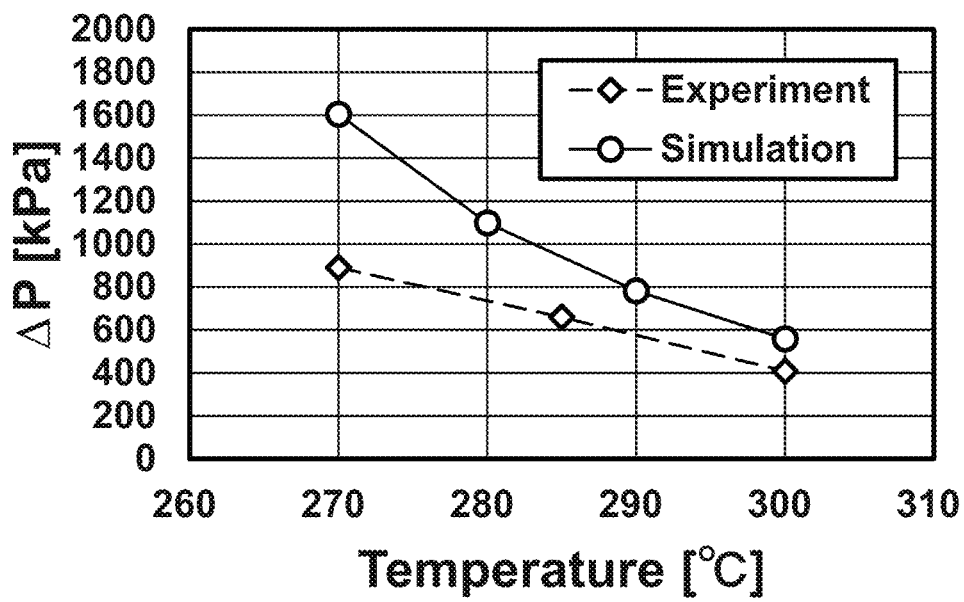
FIG. 36 is a graph showing actual values of pressure drop with respect to temperature and analytic values in simulation in Examples 2 to 8.
Figure 37:
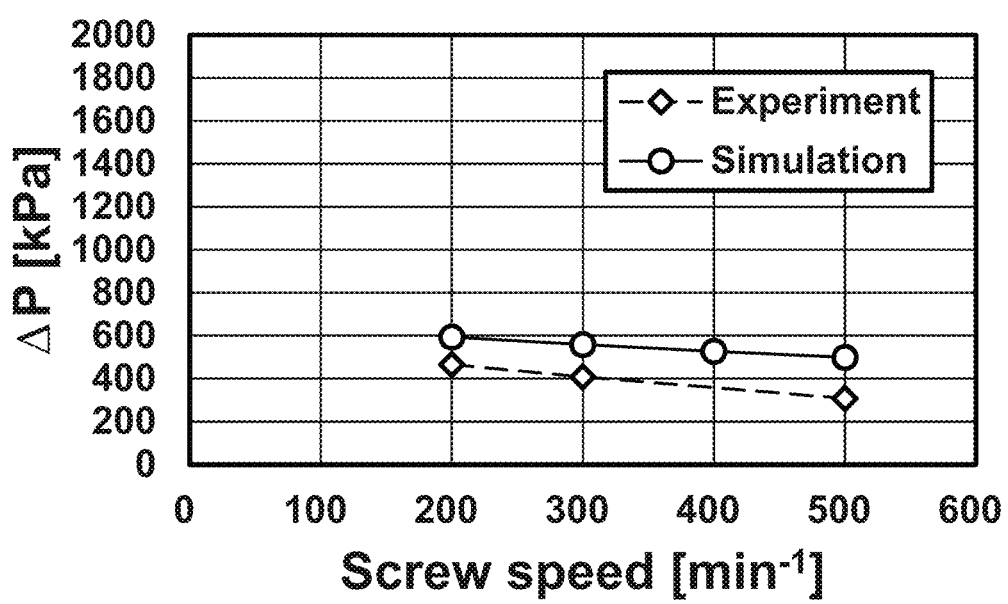
FIG. 37 is a graph showing actual values of pressure drop with respect to the screw rotation speed and analytic values in simulation in Examples 2 to 8.
Figure 38:
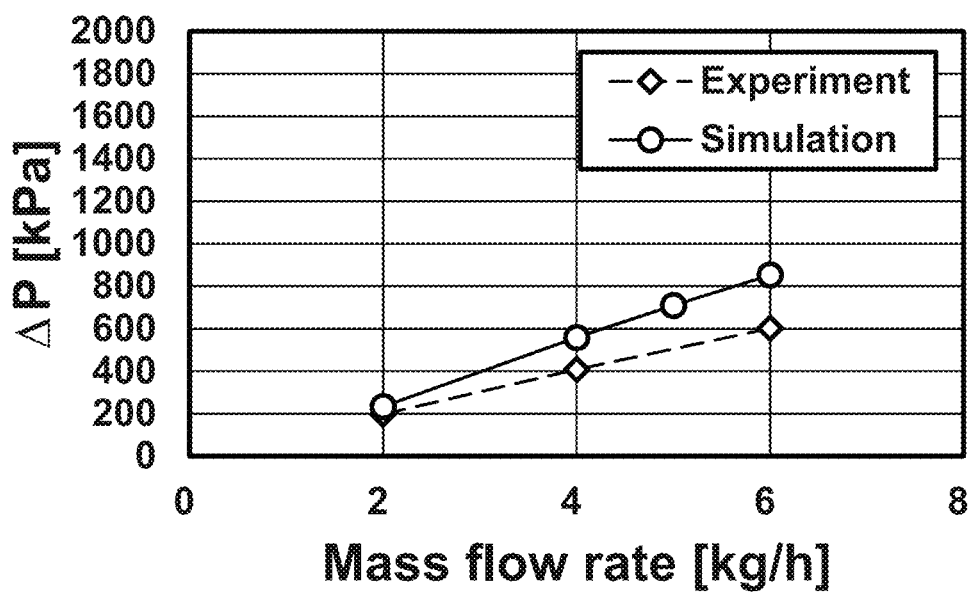
FIG. 38 is a graph showing actual values of pressure drop with respect to throughput and analytic values in simulation in Examples 2 to 8.

Regarding Examples 2 to 8, FIGS. 36 to 38 show the actual value and the analytic value by simulation of pressure drop.

The results shown in the graphs demonstrated that a large pressure drop can be obtained by using a low barrel temperature and a low rotation speed and increasing the throughput (flow rate).

<Relationship Between Kneading Conditions and Pressure Drop>

Figure 39:
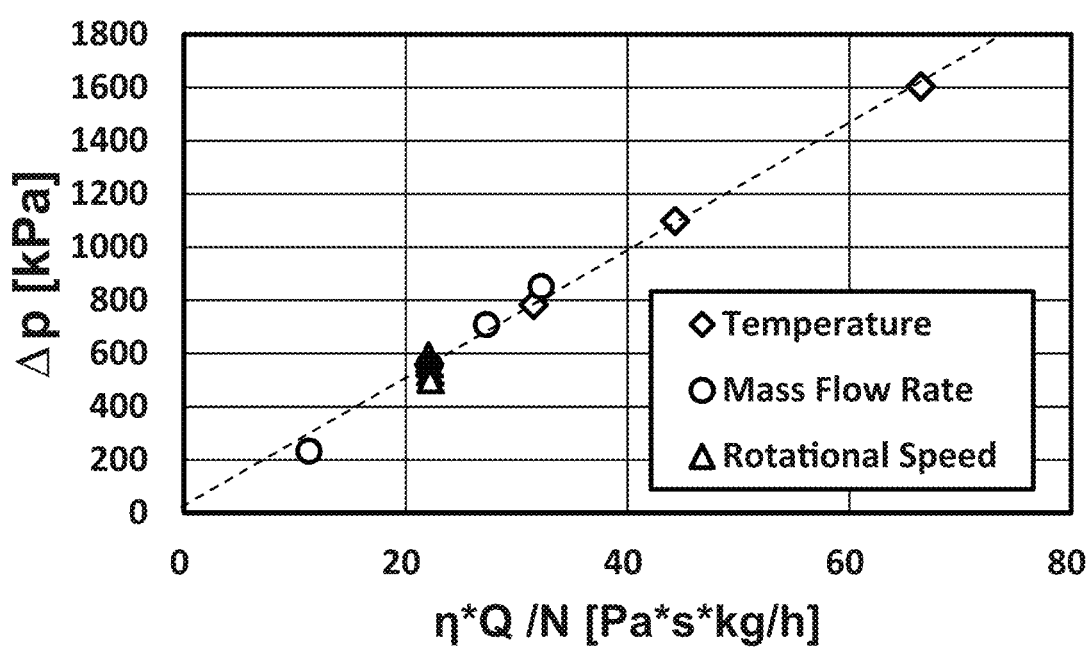
FIG. 39 is a graph showing a relationship between the product of viscosity and flow rate and pressure drop in Examples 2 to 8.

Regarding Examples 2 to 8, the relationship between the product of viscosity (η: shear viscosity in the inside of through-hole) and flow rate (Q/N: flow rate for one through-hole) and the value of pressure drop under each kneading conditions was as shown in FIG. 39.

This result is consistent with the following understanding.

The power-law is represented by the following expression.

$$\eta(\dot{\gamma}, T) = K(T)\dot{\gamma}^{n-1}$$ [Math. 16]

The following expression is derived from the Hagen-Poiseuille equation.

$$\Delta P = 2K \frac{L}{R} \left(\frac{Q}{N}\right)^n \left(\frac{3n+1}{n\pi R^3}\right)^n$$ [Math. 17]

In the expression above,
K: viscosity coefficient,
Q: flow rate,
n: power-law index,
N: number of through-holes,
R: through-hole diameter, and
L: through-hole length.

Since viscosity depends on temperature and shear rate, a change in barrel temperature or rotation speed as the kneading conditions is equivalent to a change in viscosity. In addition, a change in throughput is equivalent to a change in flow rate.

<Shear Rate and Extension Rate at Disk-Shaped Segment Through-Hole Portion>

Figure 40:
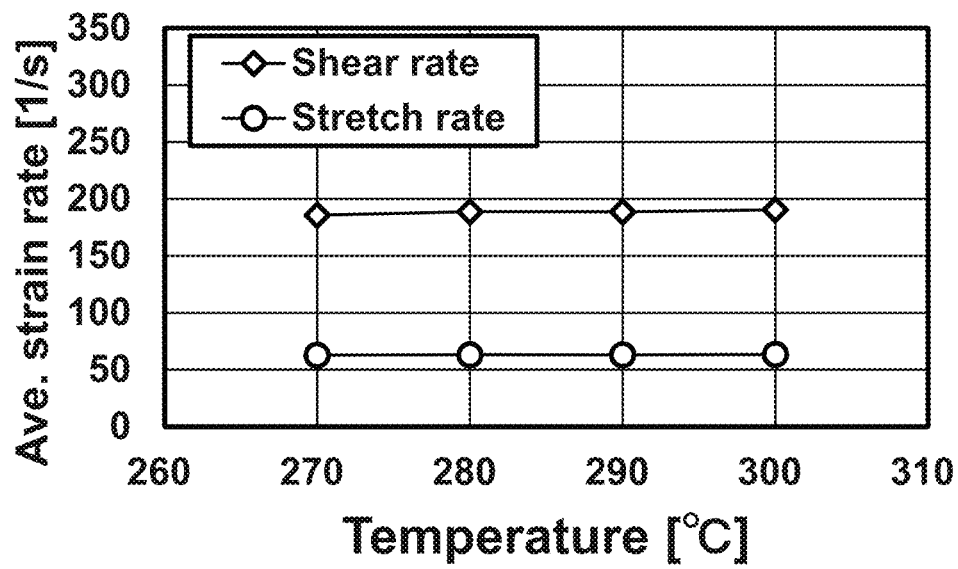
FIG. 40 is a graph showing the results of analysis of shear rate and extension rate (stretch rate) at the disk-shaped segment through-hole portion at different temperatures based on simulation of kneading extrusion of COP/SWCNT.
Figure 41:
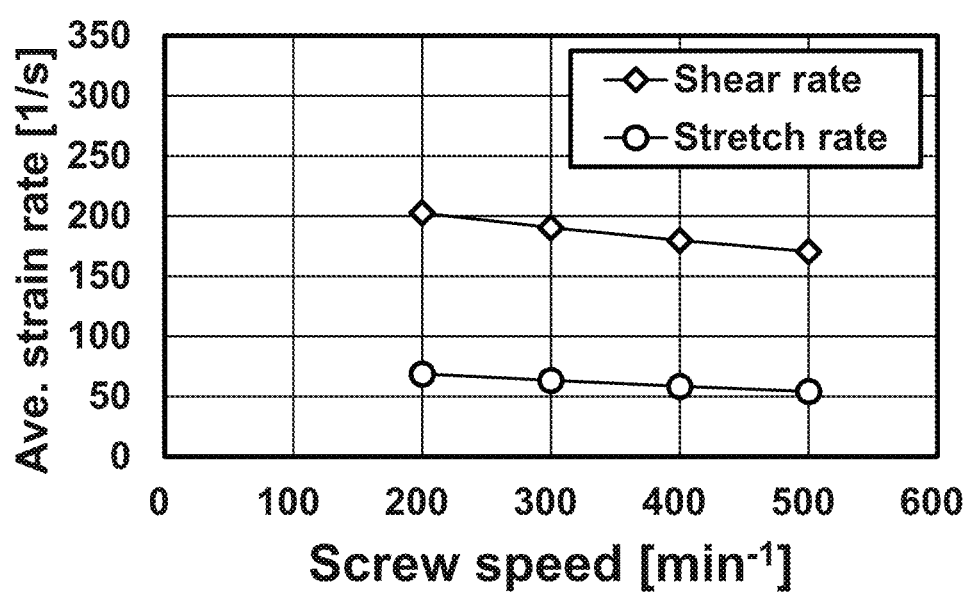
FIG. 41 is a graph showing the results of analysis of shear rate and extension rate (stretch rate) at the disk-shaped segment through-hole portion at different screw rotation speeds based on simulation of kneading extrusion of COP/SWCNT.
Figure 42:
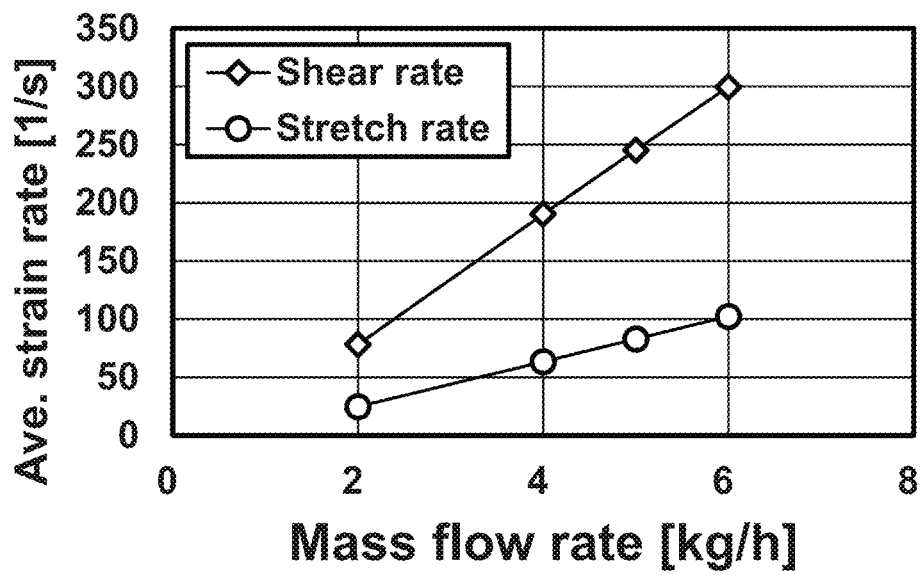
FIG. 42 is a graph showing the results of analysis of shear rate and extension rate (stretch rate) at the disk-shaped segment through-hole portion at different throughputs based on simulation of kneading extrusion of COP/SWCNT.

FIGS. 40 to 42 show the results of analysis of shear rate and extension rate (stretch rate) at the disk-shaped segment through-hole portion based on simulation of the kneading extraction of COP and SWCNT.

The results shown in the graphs demonstrated that the barrel temperature (resin temperature) does not affect the strain rate (however, the stress increases), and the strain rate decreases with an increase in the screw rotation speed and increases with an increase in the flow rate. These tendencies are the same as those in the pressure drop (the pressure drop and the functioning stress are equivalent to each other).

<Relationship Between Pressure Drop and SME>

Figure 43:
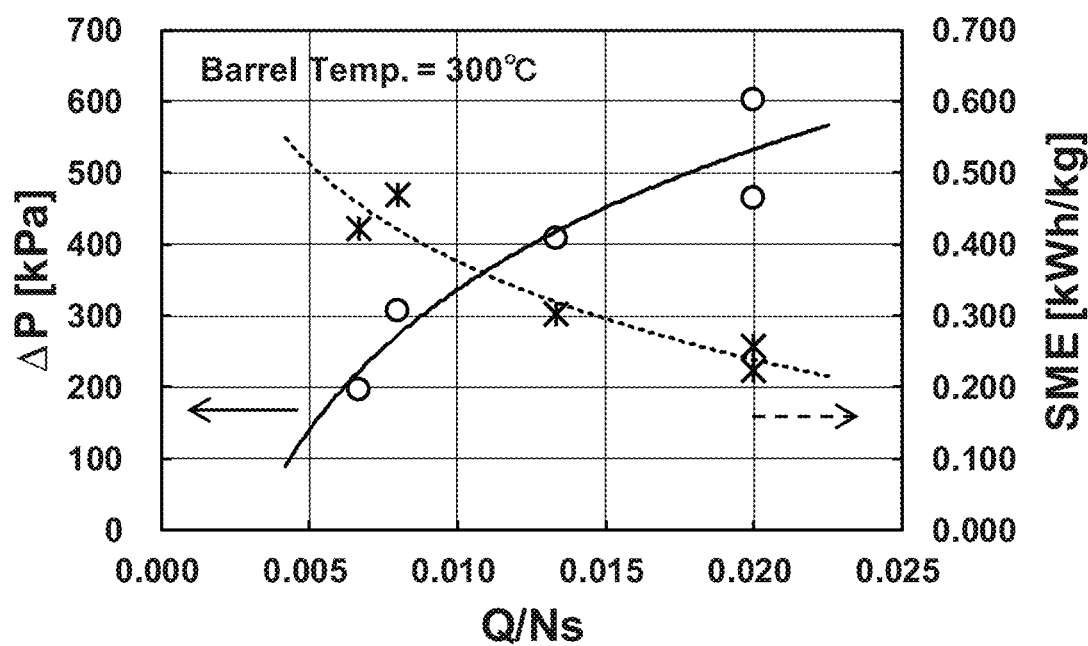
FIG. 43 is a graph showing relationship between pressure drop and SME in Examples 2 to 8.

FIG. 43 shows a relationship between pressure drop and SME regarding Examples 2 to 8.

The results shown in the graph demonstrated that the pressure drop (Δp) increases with an increase in Q/Ns, whereas the SME decreases with an increase in Q/Ns. That is, it was demonstrated that pressure drop and SME tend to be contradictory.

<Viscoelastic Property and Surface Resistivity>

Figure 44:
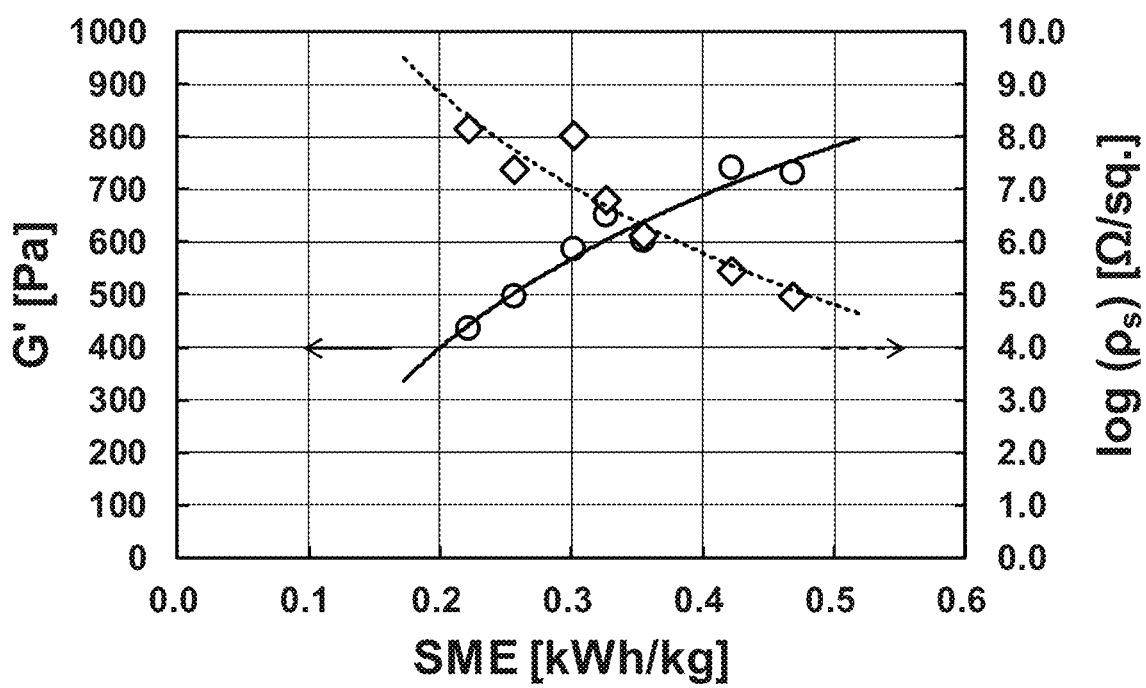
FIG. 44 is a graph showing a relationship between viscoelastic property and surface resistivity in Examples 2 to 8.

FIG. 44 shows a relationship between viscoelastic property and surface resistivity regarding in Examples 2 to 8.

The results shown in the graph demonstrated that G' increases with an increase in SME (a decrease in Q/Ns), and the surface resistivity decreases (conductivity is improved) with an increase in SME. That is, entanglement of SWCNT depends on SME.

<Tensile Properties>

Figure 45:
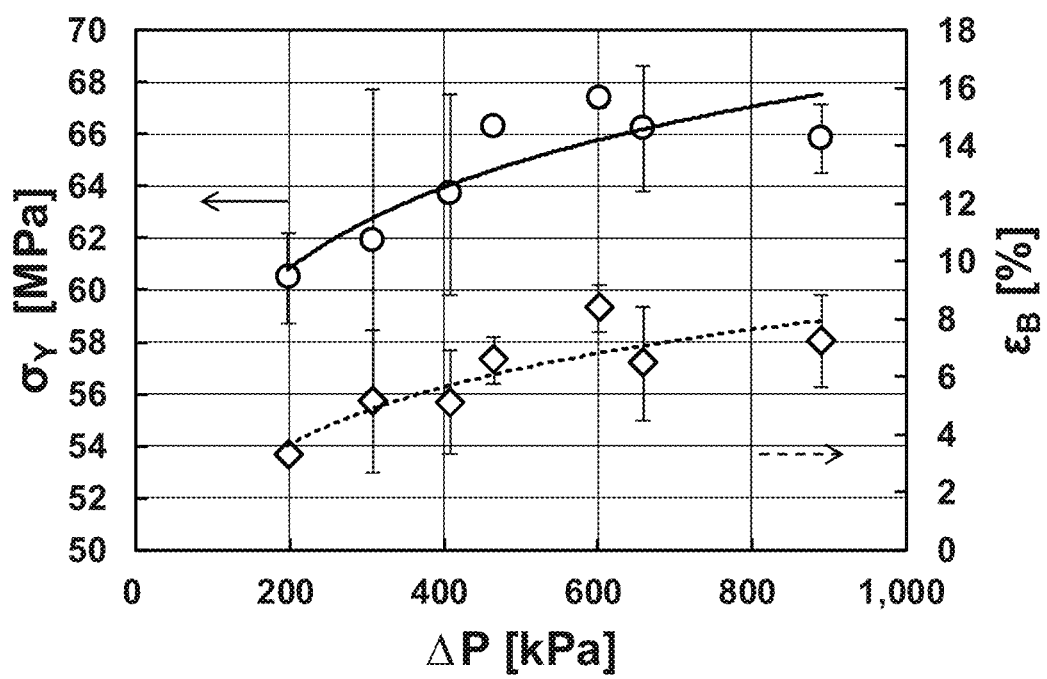
FIG. 45 is a graph showing the results of the tensile test in Examples 2 to 8.

FIG. 45 shows the results of the tensile test regarding Examples 2 to 8. Incidentally, the tensile strength (σγ) of COP alone is 61 MPa, and the fracture elongation ($\varepsilon_B$) is 20%.

The results shown in the graph demonstrated that not only the tensile strength but also the fracture elongation increase with an increase in pressure drop (Δp) (an increase in Q/Ns).

<Morphological Observation>

Figure 46:
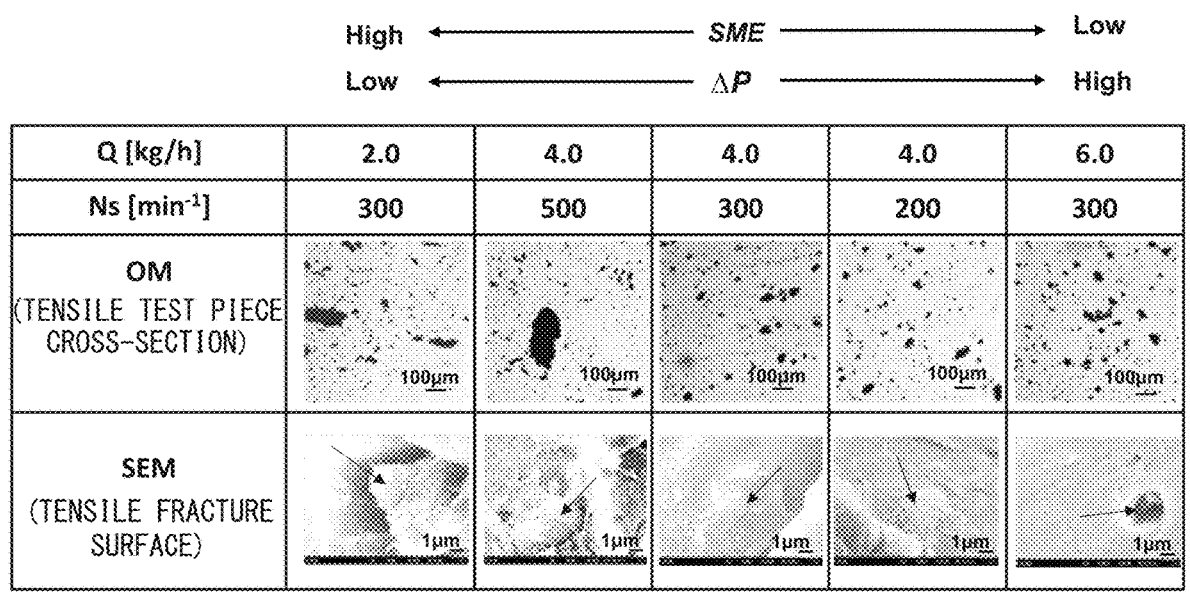
FIG. 46 is a graph showing the results of morphological observation in Examples 2 to 8.

FIG. 46 shows the results of morphological observation regarding Examples 2 to 8.

The results shown in the diagram demonstrated the followings.

When SME is low and Δp is high, macroscopic aggregates of SWCNT are in a fine state.

When SME is high and Δp is low, large aggregates of SWCNT remain.

<Statistical Processing of Aggregate Area Distribution>

Figure 47:
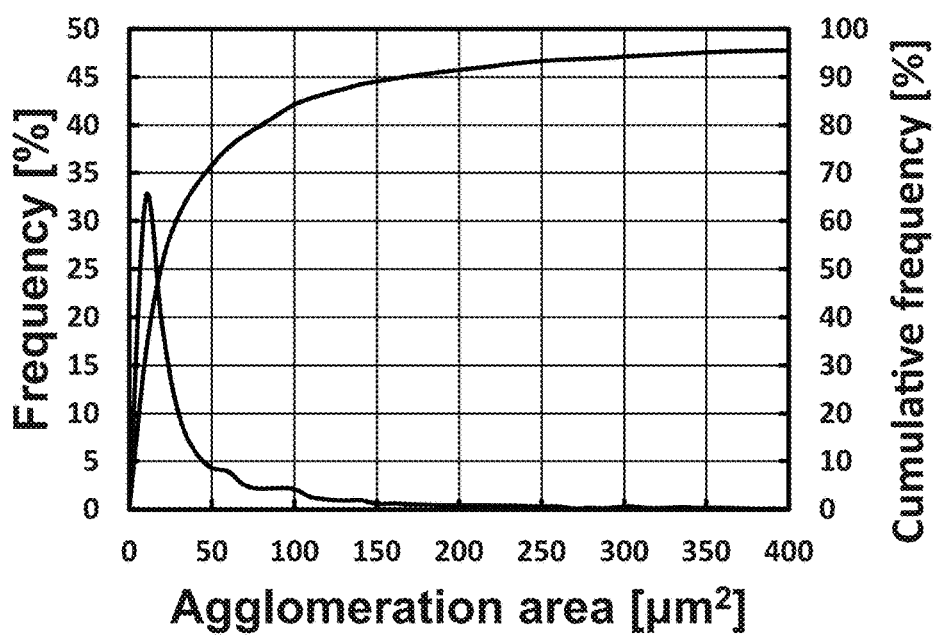
FIG. 47 is a graph showing the size distribution of aggregates in Examples 2 to 8.
Figure 48:
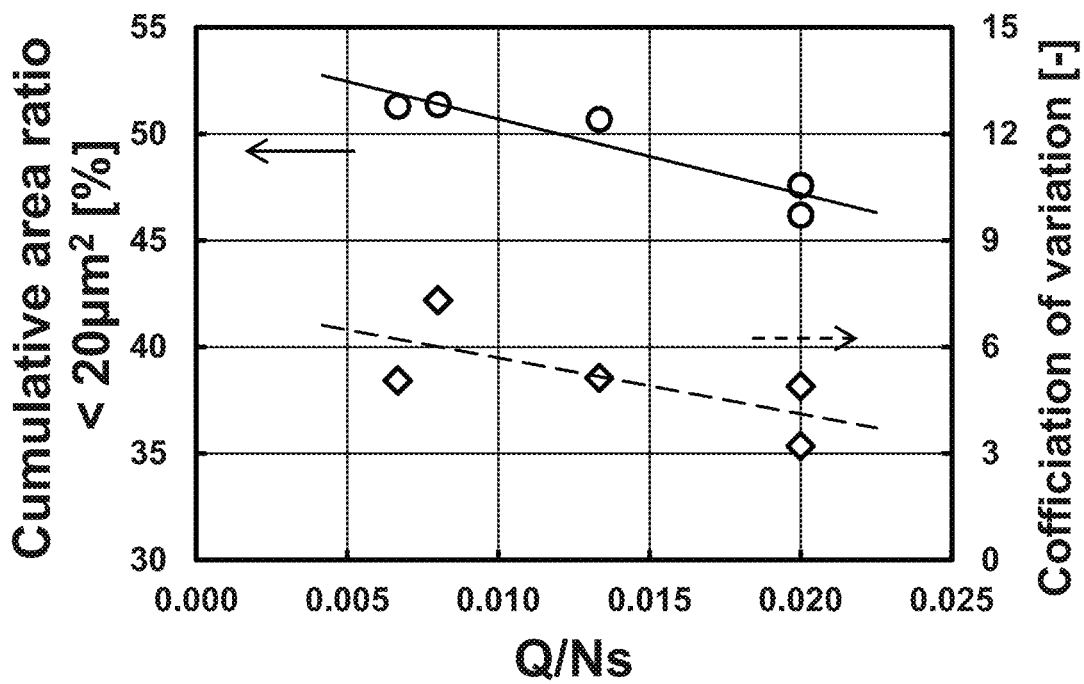
FIG. 48 is a graph showing the rate of SWCNT aggregates of 20 $\mu m^2$ or less in Examples 2 to 8.

The size distribution of aggregates and the rate of SWCNT aggregates of 20 μm² or less were calculated regarding Examples 2 to 8, and the results are collectively shown in FIGS. 47 and 48.

The results shown in these graphs demonstrated that the distribution deteriorates with an increase in Q/Ns (an increase in Δp), whereas the dispersion variance is decreased. Accordingly, it can be judged that SME promotes microscopic dispersion, and Δp promotes macroscopic dispersion.

<Influence of Contraction Ratio of Disk-Shaped Segment>

Figure 49:
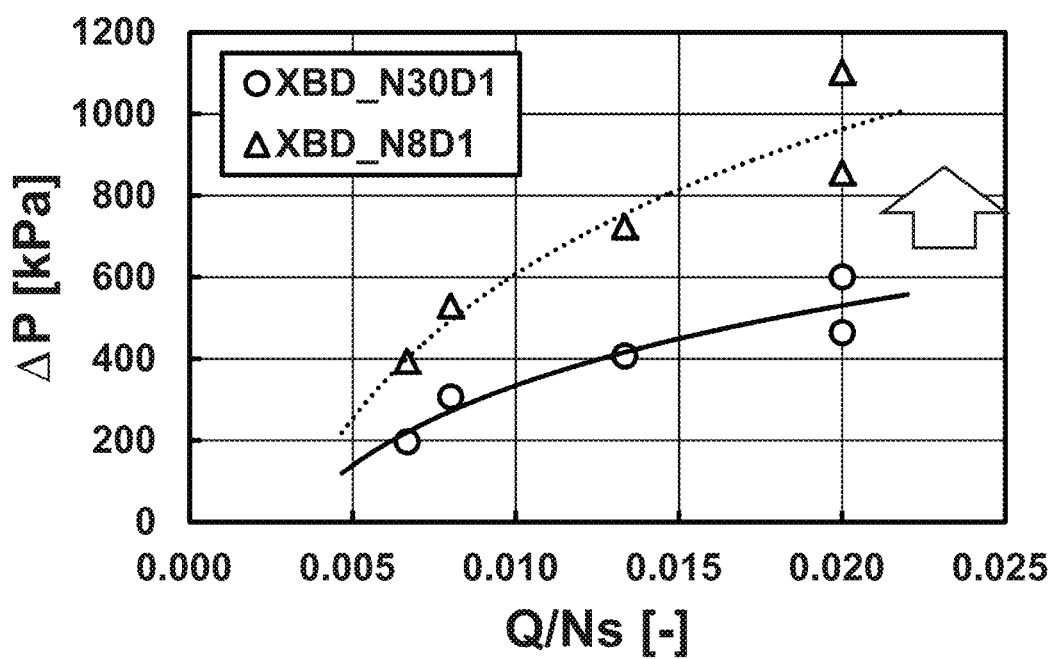
FIG. 49 is a graph showing a relationship between Q/Ns and pressure drop in Examples 2 to 15.
Figure 50:
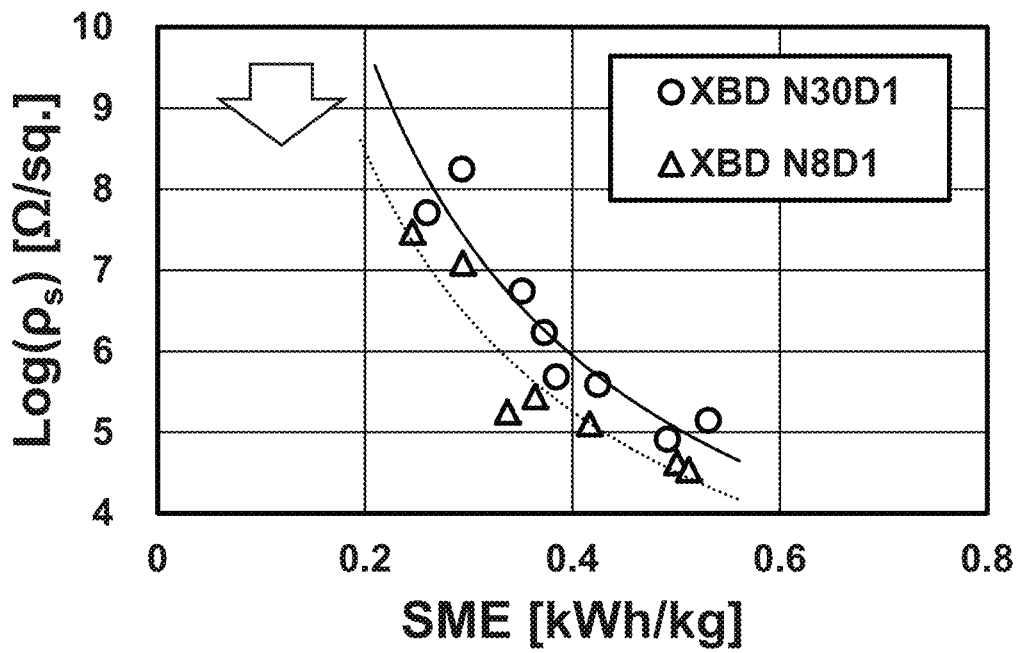
FIG. 50 is a graph showing a relationship between SME and surface resistivity in Examples 2 to 15.

FIGS. 49 and 50 show a relationship between Q/Ns and pressure drop and a relationship between SME and surface resistivity, respectively, regarding Examples 2 to 15.

In the graphs, "XBD N30D1" indicates the results of Examples 2 to 8 using XBD having 30 small holes, and "XBD N8D1" indicates the results of Examples 9 to 15 using XBD having 8 small holes.

The results shown in these graphs demonstrated that the pressure drop is improved by decreasing the contraction ratio (decreasing the number of small holes) and as a result, the conductivity (dispersion) can be improved.

<Influence of Screw Pitch>

Figure 51:
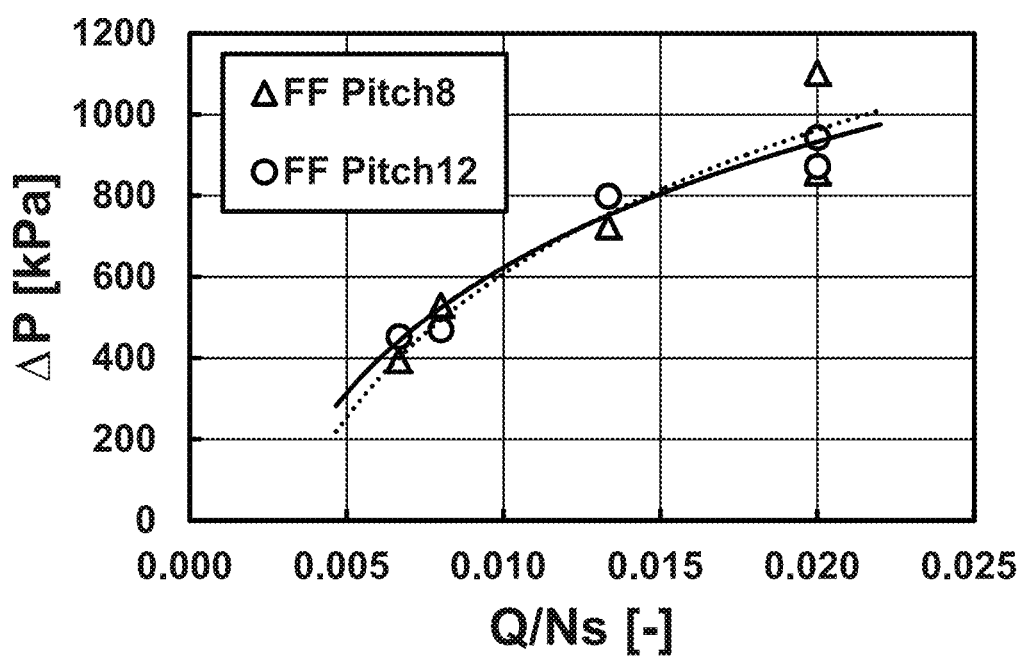
FIG. 51 is a graph showing a relationship between Q/Ns and pressure drop in Examples 2 to 8 and Examples 16 to 22.
Figure 52:
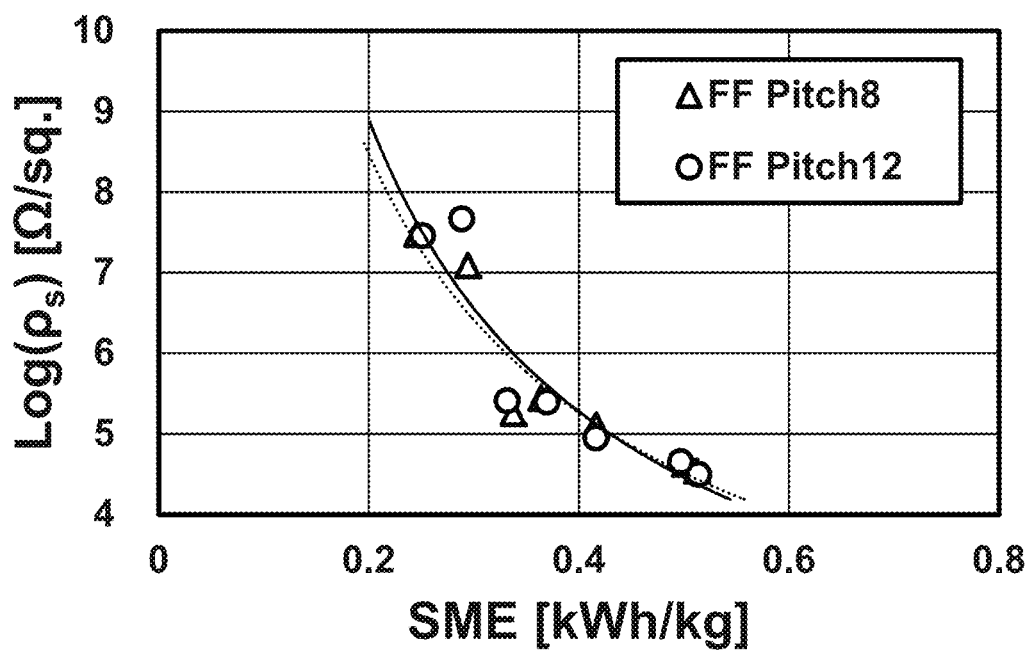
FIG. 52 is a graph showing a relationship between SME and surface resistivity in Examples 2 to 8 and Examples 16 to 22.

FIGS. 51 and 52 show a relationship between Q/Ns and pressure drop and a relationship between SME and surface resistivity, respectively, regarding Examples 2 to 8 and Examples 16 to 22.

In the graphs, "FF Pitch12" indicates the results of Examples 2 to 8 using a full-flight screw having a screw pitch of 12 mm, and "FF Pitch8" indicates the results of Examples 16 to 22 using a full-flight screw having a screw pitch of 8 mm.

The results shown in these graphs demonstrated that even if the screw pitch width is decreased, the pressure drop hardly changes, and the conductivity (dispersion) is also hardly improved.

<Conclusion of the Above Measurement and Evaluation>

The pressure drop (Δp) generated by the disk-shaped segment of the present invention is proportional to the product of viscosity and flow rate and increases with an increase in Q/Ns. The viscosity and the flow rate can be changed by changing the kneading conditions.

The tensile strength is drastically improved by an increase in Δp. On the other hand, the conductivity is improved by an increase in SME. This fact demonstrated that Δp promotes macroscopic homogeneous dispersion of a dispersed material, whereas SME promotes microscopic dispersion.

SME and Δp are in a reciprocal relationship, and their coexistence is difficult. However, with the result that the pressure drop was increased by decreasing the number of small holes from 30 to 8, it was demonstrated that Δp can be improved by decreasing the penetration area of the throughholes. On the other hand, it was demonstrated that a decrease in screw pitch is not very effective for improving the Δp.

As described above, each of above Examples clarified that the present invention is effective even if a cycloolefin polymer and monolayer nanotubes were used, whereas polypropylene and multilayer carbon nanotubes were used in Example 1. Thus, the present invention is broadly applicable regardless of the types of the resin and the resin additive.

In particular, monolayer nanotubes tend to form large aggregates due to the large relative surface area and are difficult to disperse. According to the present invention, even such a kneading material can be well dispersed, and it was confirmed that the present invention is extremely excellent as a kneading extrusion technology. The influence of kneading conditions, XBD shape, screw configuration, etc. on the dispersibility were considered by each of above Examples, and the significance of the present invention was further clarified.

Examples 23 to 27

The disk-shaped segment (XBD) shown in FIG. 8 was disposed in the barrel of a twin-screw kneading extruder "ZSK18 MEGAlab" (manufactured by Coperion GmbH, screw diameter: 18 mm, L/D: 40), and kneading extrusion was performed.

As shown in FIG. 8, the number of the small holes of the XBD was 30. The diameter of the small holes was 1 mm, and the width (depth) of the small holes in the axial direction was 3 mm (the width of the disk including the other portion in the axial direction was 7 mm).

Polymethylmethacrylate (PMMA) (manufactured by Mitsubishi Chemical Corporation, VH001) was used as the matrix of a polymer blend. The density was 1.19 g/cm$^3$, and the melt flow rate (MFR) was 2.0 g/10 min (230° C., 3.73 N).

Polycarbonate (PC) (manufactured by Mitsubishi Engineering-Plastics Corporation, H-4000) was used as the dispersion phase. The density was 1.20 g/cm$^3$, and the MFR was 63 g/10 min (300° C., 1.20 kgf).

PMMA and PC were dry blended such that the PC content was 4 wt %, and the mixture was supplied to a twin-screw kneading extruder from a hopper, followed by kneading extrusion.

Figure 53:
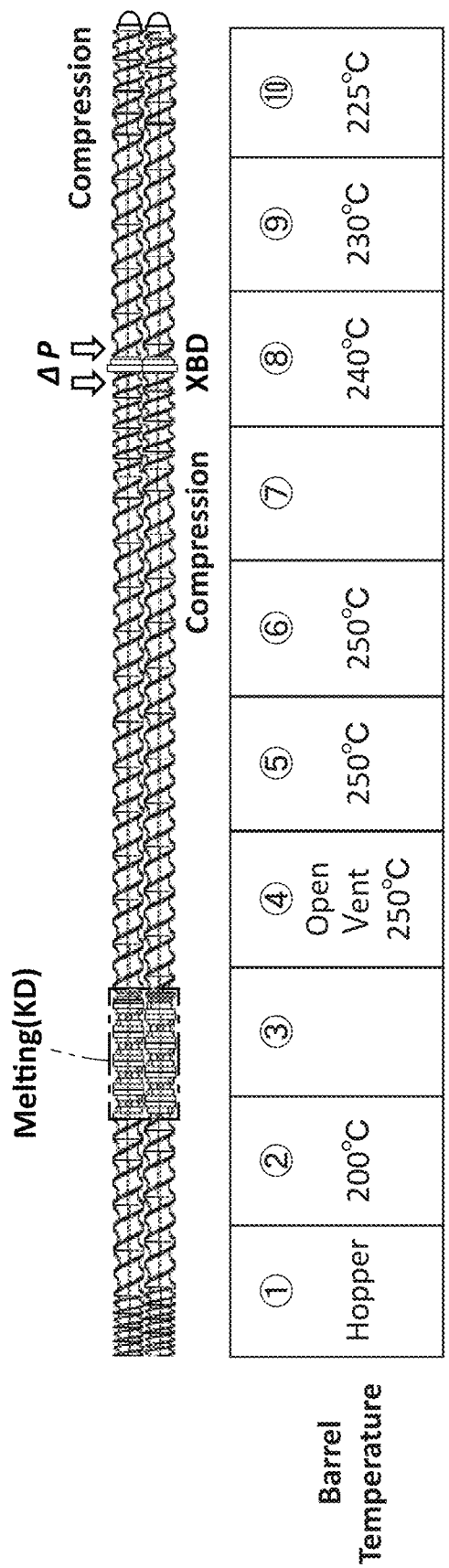
FIG. 53 is a schematic diagram of a twin-screw kneading extruder showing the arrangement positions of disk-shaped segments in Examples 23 to 32.

FIG. 53 shows the position of XBD disposed in the twin-screw kneading extruder. The "Melting (KD)" in the diagram indicates a kneading disk (that shown in FIG. 10) used for melting.

The kneading extrusion conditions in each Example were as shown in the following table.

TABLE 3

| | Screw rotation speed Ns [min$^{-1}$] | Throughput Q [kg/h] | Q/Ns |
|---|---|---|---|
| Example 23 | 150 | 3.5 | 0.023 |
| Example 24 | 200 | | 0.018 |
| Example 25 | 300 | | 0.012 |
| Example 26 | 150 | 2.0 | 0.013 |
| Example 27 | | 5.0 | 0.033 |

Examples 28 to 32

Figure 54:
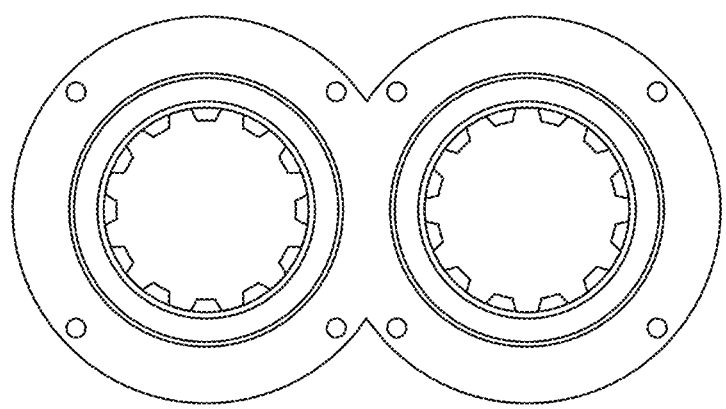
FIG. 54 is a photograph of the disk-shaped segment used in Examples 28 to 32.

Kneading extrusion was performed as in Examples 23 to 27 except that XBD having 8 small holes shown in FIG. 54 was used.

Comparative Examples 3 to 7

Figure 55:
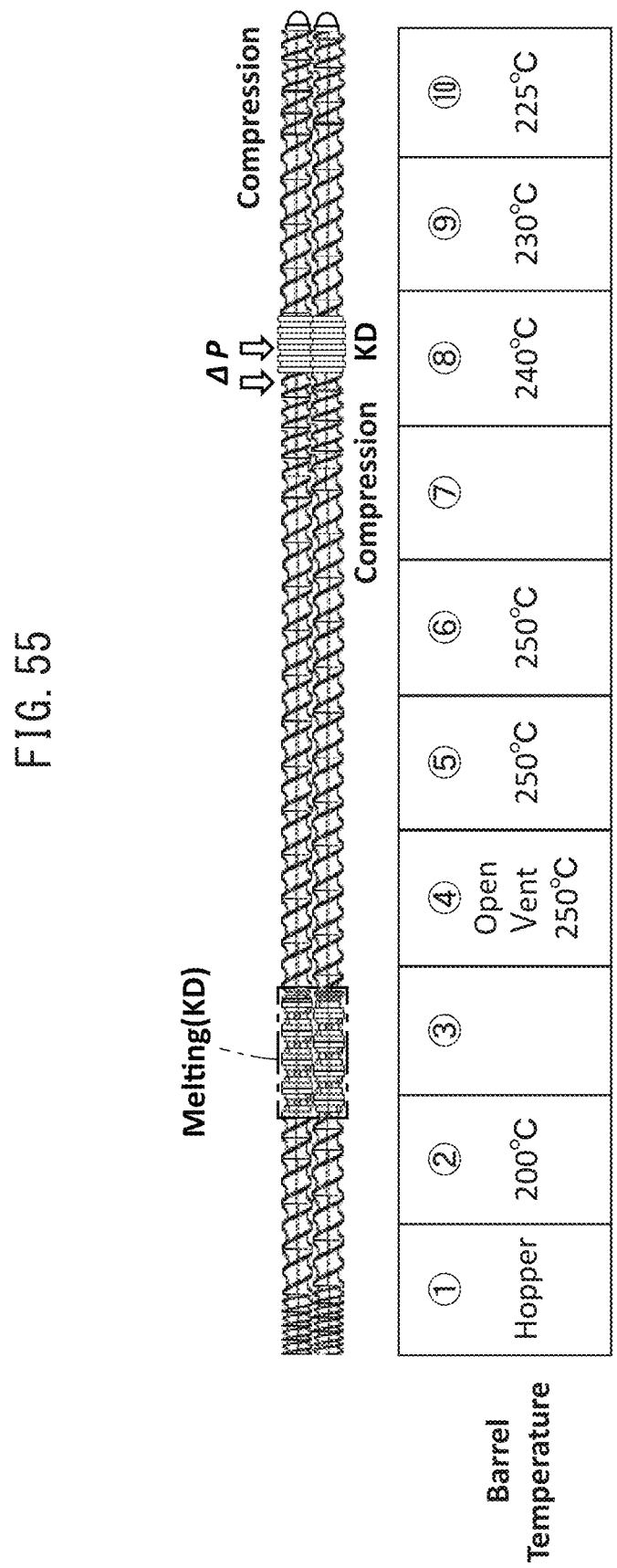
FIG. 55 is a schematic diagram of a twin-screw kneading extruder showing the arrangement positions of disk-shaped segments in Comparative Examples 3 to 7.

The disk-shaped segment (KD) shown in FIG. 10 was disposed instead of XBD in the barrel of a twin-screw kneading extruder "ZSK18 MEGAlab" (manufactured by Coperion GmbH, screw diameter: 18 mm, L/D: 40), and kneading extrusion was performed. The arrangement position of KD was as shown in FIG. 55. Other conditions were the same as those in Examples 23 to 27.

[Measurement and Evaluation]

<Viscosity Ratio>

The steady dynamic viscosity of each resin was measured with a high-pressure twin bore capillary rheometer (manufactured by Malvern Instruments Ltd., Rosand RH2200). Each resin was dried with a hot air drier at 80° C. for 24 hours or more and was then subjected to measurement of viscosity within a shear rate range of about 100 s$^{-1}$ to 10000 s$^{-1}$ from 240° C. to 280° C. at intervals of 10° C., and viscosity ratios of PC to PMMA were determined.

<Pressure Drop>

Two pairs of pressure sensors (NP462) manufactured by Dynisco were attached to a self-making barrel for a twin-screw extruder, and the pressure drop (ΔP) was measured in front and behind the XBD.

<Evaluation of Dispersion>

From three viewpoints, transmission electron microscopic (TEM) observation, haze measurement, and DSC measurement, evaluation was performed. Specifically, the evaluation was performed as follows.

(1) TEM Observation

The constitutional conditions of the PMMA/PC polymer blend were observed with a transmission electron microscope TEM (manufactured by JEOL Ltd., JEM-2100). A pellet prepared by two-screw extrusion was cut into flakes having a thickness of about 100 nm with a microtome, followed by observation at an acceleration voltage of 200 kV.

The average droplet diameter $d_{PC}$ of PC in PMMA was determined by measuring the diameters of about 300 or more PC particles in a TEM image observed using an image processing system Sigma Scan Pro (manufactured by Systat Software Inc.) at a magnification of 40000× and calculating the average particle diameter $d_{PC}$ of the PC particles.

(2) Haze Measurement

The kneading extruded product was rapidly cooled by water cooling to obtain a pellet. The pellet was then formed into a planar material (70×120×3.4 mm) by injection molding, and the haze was measured with a haze meter (manufactured by Nippon Denshoku Industries Co., Ltd., NDH2000) in accordance with JIS K 7136 (ISO 14782).

(3) DSC Measurement

A planar material was formed as in the above (2).

The glass transition temperature of this planar material was measured using a differential scanning calorimeter (DSC) "Q 1000" (manufactured by TA Instrument) under the following conditions:

temperature rising: 10° C. (K)/min, in a range of 2° C. to 200° C.

Under nitrogen atmosphere.

The measurement was performed based on a shift of baseline in a process of raising the temperature (2nd run) when the temperature was raised and held once, then lowered, and raised again.

[Results and Consideration]

<Viscosity Ratio of PMMA and PC (Rheology Data)>

Figure 56:
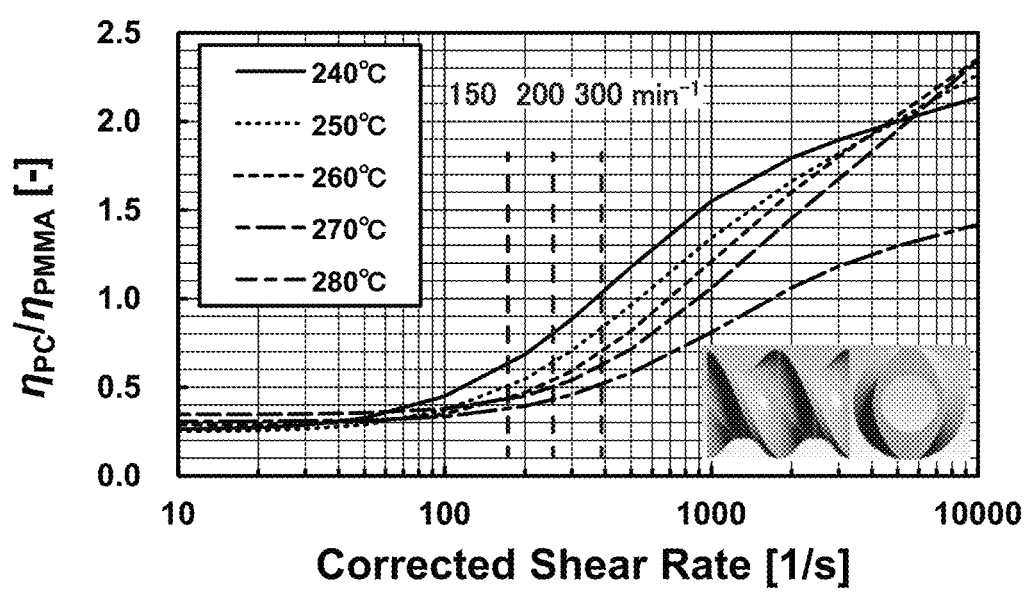
FIG. 56 is a graph showing the viscosity ratio (shear rate and temperature dependence) of polycarbonate (dispersion phase) to polymethylmethacrylate (matrix).

FIG. 56 shows a graph showing the viscosity ratio (shear rate and temperature dependence) of PC (dispersion phase) to PMMA (matrix).

The dispersion state of the polymer blend depends on the viscosity ratio.

The results shown in FIG. 56 demonstrated that the PMMA/PC polymer blend has a high viscosity ratio at a high shear rate (a high rotation speed) and is a material being difficult to disperse. It was also demonstrated that the PMMA/PC polymer blend also has a high viscosity ratio at a low temperature state and is a material tending to have poor dispersion.

Accordingly, it was demonstrated that kneading of the PMMA/PC polymer blend is generally difficult.

<Process Data of XBD>

Figure 57:
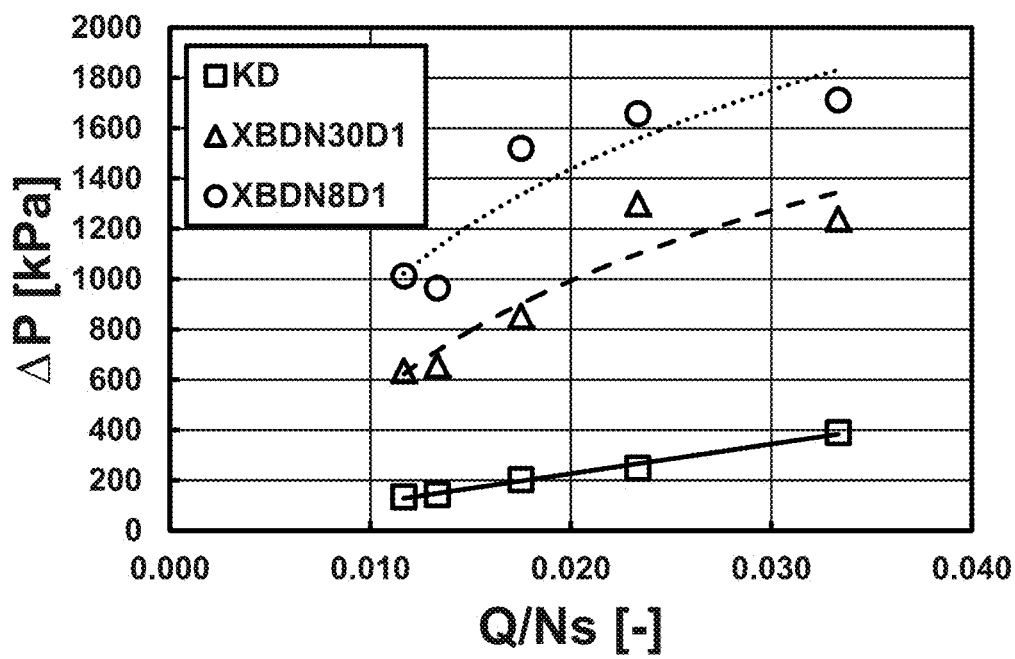
FIG. 57 is a graph showing the data on pressure drop in Examples 23 to 32 and Comparative Examples 3 to 7.
Figure 58:
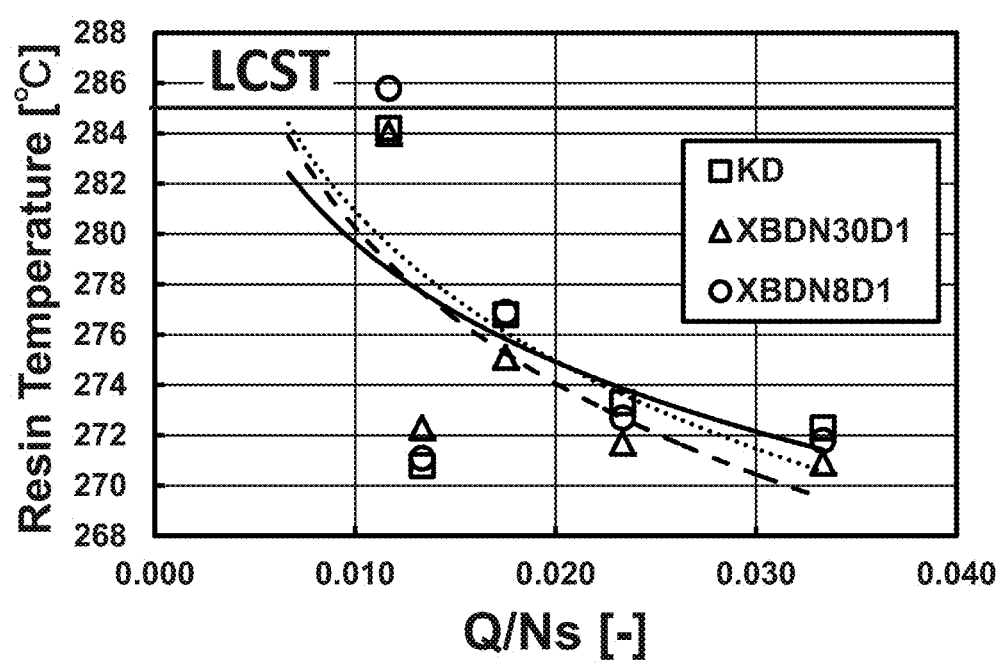
FIG. 58 is a graph showing the data on discharge temperature in Examples 23 to 32 and Comparative Examples 3 to 7.

The pressure drop and discharge temperature data in Examples 23 to 32 and Comparative Examples 3 to 7 are shown in FIGS. 57 and 58, respectively.

The results shown in the graphs demonstrated that the pressure drop (Δp) increases with an increase in Q/Ns. In addition, it was demonstrated that the smaller the Q/Ns (the higher the SME), the higher the discharge temperature, the heat generation does not depend on Δp. That is, heat generation by extensional flow is not dominant.

<Dispersion Diameter of PC in PMMA>

Figure 59:
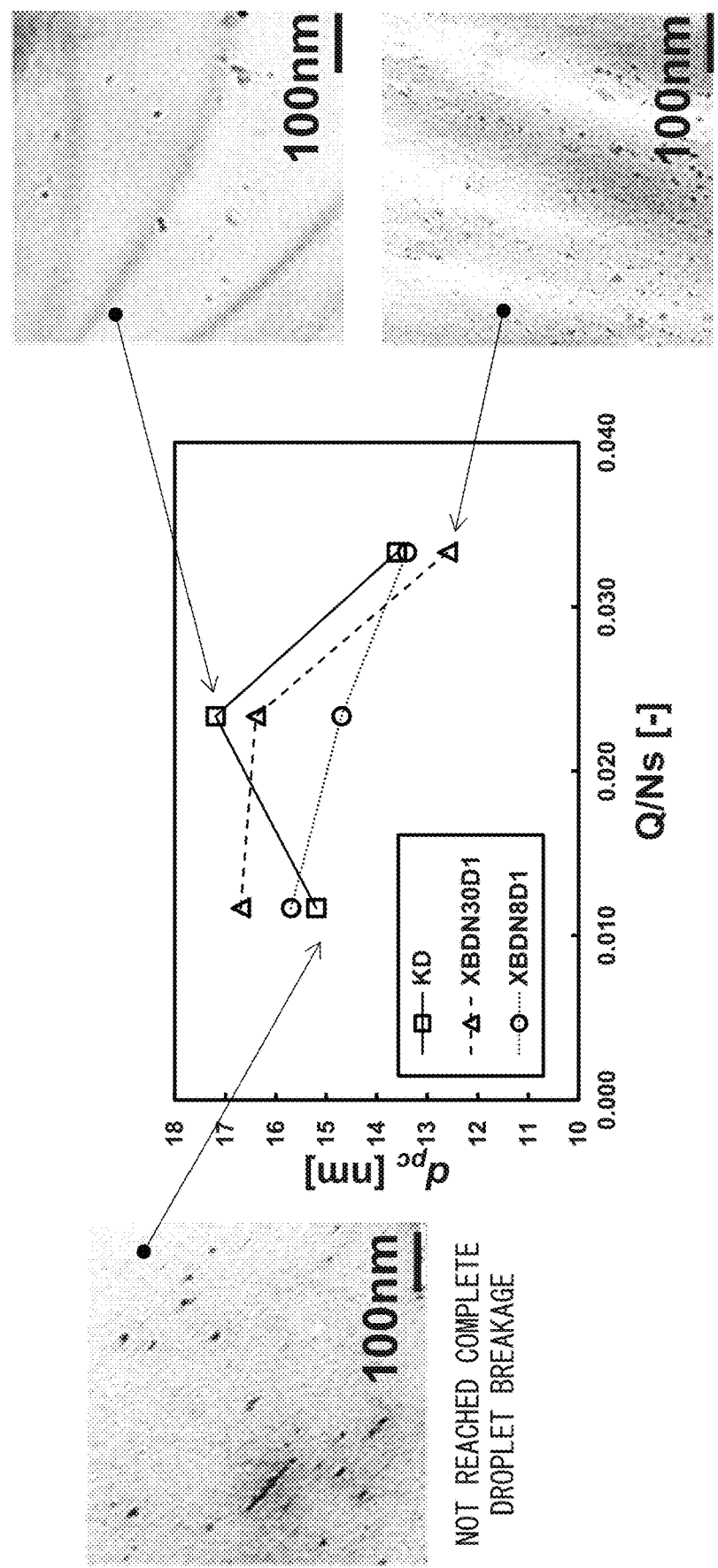
FIG. 59 is a graph showing a relationship between PC dispersion diameter and haze value in Examples 23 to 32 and Comparative Examples 3 to 7.

FIG. 59 shows the results of TEM observation. The droplet diameter $d_{pc}$ [nm] is the average of about 300 droplets.

The results shown in the graph demonstrated that the dispersion diameter of PC tends to decrease with an increase in Q/Ns.

<Haze Value>

Figure 60:
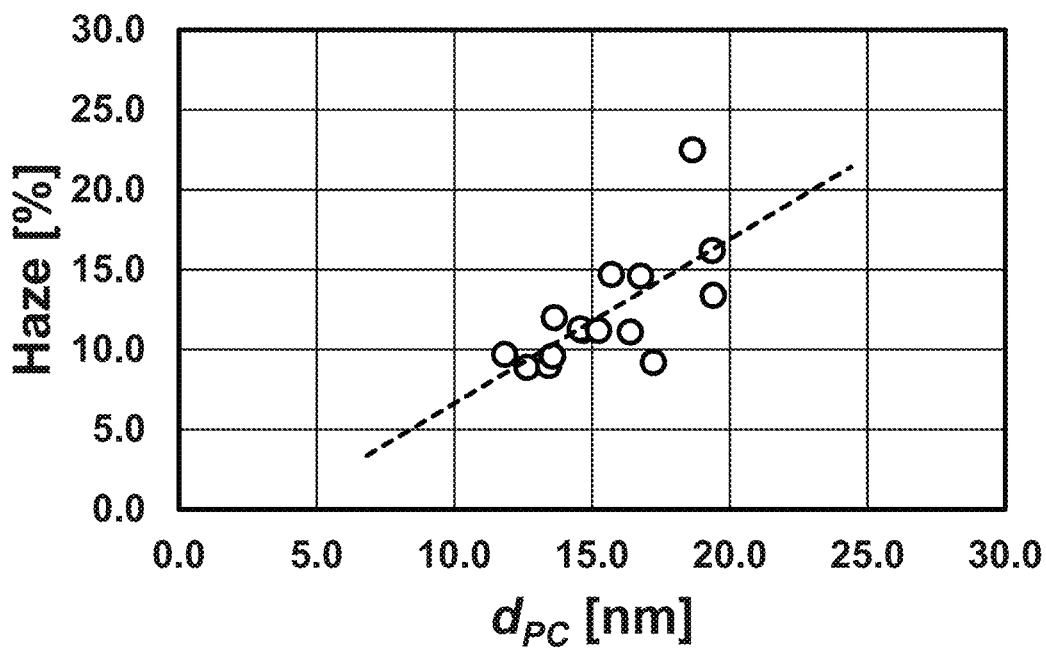
FIG. 60 is a graph showing the results of measurement of PC droplet diameter in Examples 23 to 32 and Comparative Examples 3 to 7.
Figure 61:
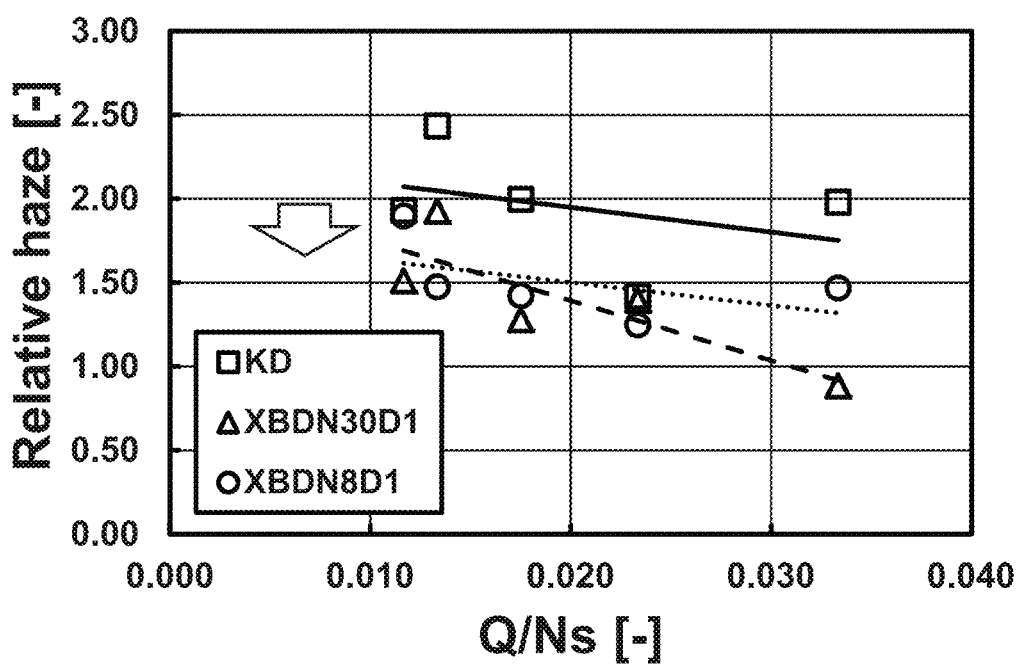
FIG. 61 is a graph showing relative haze values (relative values with respect to the haze value of PMMA alone) in Examples 23 to 32 and Comparative Examples 3 to 7.

FIG. 60 shows a relationship between the above-described PC dispersion diameter and haze value regarding Examples 23 to 32 and Comparative Examples 3 to 7. FIG. 61 shows relative haze values (relative values to the haze value of PMMA alone).

The results shown in the graphs demonstrated that the droplet diameter of PC when XBD was used is smaller than that when KD was used and consequently the haze value is decreased (high transparency).

<Glass Transition Temperature>

The results of measurement of glass transition temperatures regarding Examples 23 to 32 and Comparative Examples 3 to 7 are shown in Table 4.

TABLE 4

| Kneading conditions | | | Glass transition temperature (° C.) | | |
|---|---|---|---|---|---|
| Screw rotation speed Ns [min$^{-1}$] | Throughput Q [kg/h] | Q/Ns | KD | XBD (N30D1) | XBD (N8D1) |
| PMMA (Pure) | | | | 113 | |
| 150 | 3.5 | 0.023 | 115 | 114 | 115 |
| 200 | | 0.018 | 114 | 114 | 115 |
| 300 | | 0.012 | 114 | 114 | 115 |
| 150 | 2.0 | 0.013 | 114 | 114 | 115 |
| | 5.0 | 0.033 | 114 | 114 | 115 |

The results shown in the above table demonstrated that the glass transition temperature (Tg) increases with improvement in the pressure drop of XBD.

<Conclusion of the Above Measurement and Evaluation>

Since a PMMA/PC polymer blend has an LCST-type phase diagram, an increase in shear rate and shear heat generation accompanied therewith cause phase separation, and excessive shear kneading is unsuitable.

From this viewpoint, the disk-shaped segment of the present invention can provide a large pressure drop while suppressing shear heat generation and therefore enables a process to improve heat resistance while maintaining transparency.

That is, it was demonstrated that the disk-shaped segment of the present invention is extremely effective also in application to a polymer blend.

REFERENCE SIGNS LIST 1 twin-screw kneading extruder
11 barrel
12 hopper
13 side feeder
14 vent
21 kneading screw
22 disk-shaped segment
221 disk body
222 shaft penetrating part
221a small hole

What is claimed is:

1. A multi-screw kneader comprising:
a barrel;
an input port for supplying a kneading material into the barrel;
a plurality of full-flight screws for transferring the kneading material; and
a disk-shaped segment for promoting extensional flow of the kneading material in the barrel,
wherein:
helical threads of the plurality of full-flight screws extend from a first position at or adjacent to a first terminal end of the barrel to a second position at or adjacent to a second terminal end of the barrel;
the disk-shaped segment is fixed in the barrel so as to partition an inside of the barrel;
the disk-shaped segment is at an intermediate position of the plurality of full-flight screws and on a downstream side of the input port;
the disk-shaped segment has: (i) a disk body with holes configured to serve as flow channels of the kneading material; (ii) a plurality of rolling bearings mounted on the disk body; and (iii) a plurality of rings fitted to the plurality of rolling bearings, respectively, such that mating structures on respective shafts of the plurality of full-flight screws are fitted to mating structures of the plurality of rings, respectively, whereby the disk-shaped segment is configured to suppress leakage of the kneading material between the plurality of rolling bearings;
the mating structures of the plurality of rings are holes with cross sections matching the mating structures on the respective shafts of the plurality of full-flight screws, respectively;
an upstream shape, an upstream diameter, and an upstream size of each of the plurality of full-flight screws on an upstream side of the disk-shaped segment are the same as a downstream shape, a downstream diameter, and a downstream size of each of the plurality of full-flight screws on a downstream side of the disk-shaped segment, respectively;
the disk-shaped segment is adjacent to the helical thread of each of the plurality of full-flight screws on both the upstream side of the disk-shaped segment and the downstream side of the disk-shaped segment; and
the holes of the disk body are constantly in communication with both the upstream side of the disk-shaped segment and the downstream side of the disk-shaped segment.

2. The multi-screw kneader according to claim 1, wherein each of the holes has a diameter of 0.5 mm to 1.5 mm, and the number of the holes is 2 to 64.

3. The multi-screw kneader according to claim 1, wherein a total area of openings of the holes on a kneading material flow inlet side is 20% or less of an inner cross-sectional area of the barrel.

4. The multi-screw kneader according to claim 1, wherein the kneading material contains a resin and a resin additive.

5. A method for producing a nano-composite, the method using the multi-screw kneader according to claim 4 and comprising supplying nanoparticles as the resin additive.

6. The method according to claim 5, wherein the nanoparticles are selected from the group consisting of carbon nanotubes, carbon nanofibers, cellulose nanofibers, graphenes, nanoclays, and carbon blacks.

7. The multi-screw kneader according to claim 1, wherein the kneading material contains two or more different resins.

8. The multi-screw kneader according to claim 1, wherein the disk-shaped segment consists of the disk body configured to be fixed in the barrel, the plurality of rolling bearings mounted on the disk body, and the plurality of rings fitted to the plurality of rolling bearings, respectively.

9. The method according to claim 5, wherein a diameter of each of the holes is within a range of 0.5 mm to 1.5 mm, a depth of each of the holes in an axial direction is within a range such that a ratio of the depth (L) to a diameter (D) of each of the plurality of full-flight screws, L/D, is 1/12 to 1/4, and the number of the holes is within a range of 2 to 64.

10. The multi-screw kneader according to claim 1, wherein the mating structures of the plurality of rings and the mating structures on the respective shafts of the plurality of full-flight screws are splined structures.

11. The multi-screw kneader according to claim 1, wherein the plurality of full-flight screws are juxtaposed such that the helical thread of a first of the plurality of full-flight screws is intermeshed with the helical thread of a second of the plurality of full-flight screws.

12. The multi-screw kneader according to claim 1, wherein the disk-shaped segment has a cross-sectional shape of two circles partially overlapped such that a medial portion of the disk-shaped segment extends fully across an area between the plurality of rolling bearings.

13. A disk-shaped segment for use in a multi-screw kneader including a plurality of full-flight screws for transferring a kneading material in a barrel, helical threads of the plurality of full-flight screws extending from a first position at or adjacent to a first terminal end of the barrel to a second position at or adjacent to a second terminal end of the barrel, the disk-shaped segment being configured to be fixed in the barrel so as to partition an inside of the barrel, the disk-shaped segment being configured to be at an intermediate position of the plurality of full-flight screws and on a downstream side of an input port of the multi-screw kneader for supplying the kneading material into the barrel, an upstream shape, an upstream diameter, and an upstream size of each of the plurality of full-flight screws on an upstream side of the disk-shaped segment being the same as a downstream shape, a downstream diameter, and a downstream size of each of the plurality of full-flight screws on a downstream side of the disk-shaped segment, respectively, and the disk-shaped segment comprising:
a disk body with holes configured to serve as flow channels of the kneading material and material;
a plurality of rolling bearings mounted on the disk body;
a plurality of rings fitted to the plurality of rolling bearings, respectively, such that mating structures on respective shafts of the plurality of full-flight screws are configured to be fitted to mating structures of the plurality of rings, respectively, whereby the disk-shaped segment is configured to suppress leakage of the kneading material between the plurality of rolling bearings,
wherein:
the mating structures of the plurality of rings are holes with cross sections configured to match the mating structures on the respective shafts of the plurality of full-flight screws, respectively;
the disk-shaped segment is configured to be adjacent to the helical thread of each of the plurality of full-flight screws on both the upstream side of the disk-shaped segment and the downstream side of the disk-shaped segment; and the holes of the disk body are constantly in communication with both the upstream side of the disk-shaped segment and the downstream side of the disk-shaped segment.

14. The disk-shaped segment according to claim 13, wherein the mating structures of the plurality of rings are splined structures.

15. The disk-shaped segment according to claim 13, wherein the disk-shaped segment has a cross-sectional shape of two circles partially overlapped such that a medial portion of the disk-shaped segment extends fully across an area between the plurality of rolling bearings.

* * * * *